(12) United States Patent
Armstrong

(10) Patent No.: US 10,721,882 B2
(45) Date of Patent: Jul. 28, 2020

(54) AGRICULTURAL GROWING STRUCTURE

(71) Applicant: Danny A. Armstrong, Payson, AZ (US)

(72) Inventor: Danny A. Armstrong, Payson, AZ (US)

( * ) Notice: Subject to any disclaimer, the term of this patent is extended or adjusted under 35 U.S.C. 154(b) by 0 days.

(21) Appl. No.: 16/181,245

(22) Filed: Nov. 5, 2018

(65) Prior Publication Data

US 2019/0183075 A1   Jun. 20, 2019

Related U.S. Application Data

(63) Continuation-in-part of application No. 15/162,590, filed on May 23, 2016, now Pat. No. 10,117,389.

(51) Int. Cl.
| | | |
|---|---|---|
| *A01G 31/04* | (2006.01) | |
| *A01G 31/06* | (2006.01) | |
| *A01G 31/00* | (2018.01) | |
| *A01G 7/04* | (2006.01) | |

(52) U.S. Cl.
CPC .......... *A01G 31/04* (2013.01); *A01G 31/042* (2013.01); *A01G 31/06* (2013.01); *A01G 7/045* (2013.01); *A01G 2031/006* (2013.01)

(58) Field of Classification Search
CPC ...... A01G 31/06; A01G 31/00; A01G 31/001; A01G 31/02; A01G 31/04; A01G 31/042; A01G 9/10; A01G 2031/006; A01G 9/104
See application file for complete search history.

(56) References Cited

U.S. PATENT DOCUMENTS

| | | | | |
|---|---|---|---|---|
| 4,028,847 A * | 6/1977 | Davis | ................... | A01G 31/042 47/65 |
| 4,312,152 A * | 1/1982 | Drury | .................... | A01G 31/02 47/62 R |
| 6,233,870 B1 * | 5/2001 | Horibata | ................ | A01G 31/02 47/59 R |
| 7,080,482 B1 * | 7/2006 | Bradley | ................. | A01G 31/02 47/60 |
| 8,677,942 B2 * | 3/2014 | Bodlovich | ................ | C02F 3/32 119/227 |

(Continued)

*Primary Examiner* — Trinh T Nguyen
(74) *Attorney, Agent, or Firm* — Roy A. Ekstrand

(57) ABSTRACT

A generally planar foundation pad is formed of a material such as concrete, or the like, and supports a framework defining a plurality of concentric circular paths stacked in a cylindrical array. A plurality of helical water troughs are supported by the framework within each of the circular paths. Water circulation apparatus is provided to selected intermediate portions of the water trough to produce a continuous circulation of water. The circulating water is combined with various nutrients and the nutrient and water solution is filtered as it is circulated. Each helical water trough is formed of multiple vertically stacked layers of the trough. As a result, a great length of water trough is stacked upon a small footprint of land. Each water trough is filled with a plurality of floating growing trays to form a continuous "train" of growing trays extending down the entire water trough. As the water and nutrient solution flows down each helical water trough, the floating growing trays are carried down the water trough. As the growing trays move, they are continuously removed from the bottom end of the water trough and added at the top.

3 Claims, 24 Drawing Sheets

(56) References Cited

U.S. PATENT DOCUMENTS

| | | | | |
|---|---|---|---|---|
| 8,889,006 B2* | 11/2014 | Lassovsky | ............... | C02F 3/327 |
| | | | | 210/150 |
| 8,959,834 B2* | 2/2015 | Hashimoto | ............ | A01G 9/025 |
| | | | | 47/63 |
| 2006/0201058 A1* | 9/2006 | Ripatti | ................. | A01G 31/042 |
| | | | | 47/1.1 |
| 2011/0067301 A1* | 3/2011 | DeMitchell | ............ | A01G 31/02 |
| | | | | 47/62 C |
| 2014/0083007 A1* | 3/2014 | Galvan | ................. | A01G 31/02 |
| | | | | 47/62 A |
| 2015/0068121 A1* | 3/2015 | Probst | .................... | A01G 31/06 |
| | | | | 47/59 R |

* cited by examiner

AGRICULTURAL GROWING STRUCTURE

CROSS REFERENCE TO RELATED APPLICATIONS

This application is a Continuation-In-Part of co-pending application Ser. No. 15/162,590 filed May 23, 2016 in the name of Danny A. Armstrong and entitled AGRICULTURAL GROWING STRUCTURE, the disclosure of which is incorporated herein by reference, which application claims the benefit of and priority under 35 U.S.C. 119(e) of U.S. Provisional Patent Application No. 62/165,947, filed May 23, 2015 on behalf of Danny A. Armstrong and entitled AGRICULTURAL GROWING STRUCTURE, the disclosure of which is incorporated herein by reference. This application is further related to a simultaneously filed and co-pending application Ser. No. 16/181,305 filed Nov. 5, 2018 in the name of Danny A. Armstrong and entitled CONSTRUCTION APPARATUS AND METHOD FOR AGRICULTURAL GROWING STRUCTURE, the disclosure of which is incorporated herein by reference.

FIELD OF THE INVENTION

This invention relates generally to agricultural systems and particularly to hydroponic growing systems.

BACKGROUND OF THE INVENTION

Traditional agriculture has, for centuries been carried forward on plots of land, typically referred to as "farms". Farms have been utilized in a virtually endless variety of climates, geographical locales, sizes and circumstances. As populations increased and n n-farming land use increased, reduced amounts of agricultural land have been available. In many areas of the world this reduction of available land for farming has become critical. As the competition, for land between agricultural food producers and non-agricultural land users has intensified, agricultural food producers have struggled to supply food to ever increasing populations using less and less land. This pressure has lead many food producers to explore non-tradition methods of farming. One promising alternative to traditional farming methods is found in hydroponics. Hydroponics is basically a system of agriculture which involves growing plants in a water and nutrient mixture without the use of soil. While a number of different hydroponic systems have been developed, typically all utilize an absorbent growing medium that supports seeds and growing plants such that the plant roots extend into a nutrient-rich water solution.

While hydroponic systems were received initially as bearing great promise, development of efficient cost-effective and practical agriculture has eluded practitioners in the agricultural arts. Hydroponic systems have, for the most part, proven to be costly and complex structures that still require substantially the same extensive land areas as traditional farming. In addition, the complex structures required to grow large crops in a manner that is cost competitive with traditional farming has not been attained. There remains therefore a continuing and unresolved need in the art for a system of agriculture that effectively and efficiently addresses the critical shortage of farm land throughout the world. There remains a continuing and unresolved need in the agricultural arts for a system of agriculture that is capable of growing greater crops for a given area of land.

SUMMARY OF THE INVENTION

Accordingly, it is a general object of the present invention to provide an improved agricultural growing structure. It is a more particular object of the present invention to provide an improved agricultural growing structure that more efficiently uses a given area of land. It is a still more particular object of the present invention to provide an improved agricultural growing structure that more efficiently uses a given area of land that makes effective use of hydroponic technology.

The present invention agricultural growing structure provides a generally planar foundation pad formed of a material such as concrete, or the like, which supports a framework defining a plurality of concentric circular paths stacked in a cylindrical array. A plurality of helical water troughs are supported by the framework within each of the circular paths. Water circulation apparatus is provided which pumps water into each helical water trough at selected intermediate portions of the water trough to produce a continuous circulation of water. The circulating water is combined with various nutrients and the nutrient and water solution is filtered as it is circulated. Each helical water trough is formed of a one-piece extruded trough. As a result, a great length of water trough is stacked upon a small footprint of land. Each water trough is filled with a plurality of floating growing trays to form a continuous "train" of growing trays extending down the entire water trough. As the water and nutrient solution flows down each helical water trough, the floating growing trays are carried down the water trough. As the growing trays move, they are continuously removed from the bottom end of the water trough and added at the top.

Within each growing tray, a growing medium is provided which cooperates with slots formed in the tray bottom to maintain a wet environment within the growing tray. A quantity of seeds are placed in and on the growing medium prior to adding each growing tray at the top of the water trough. During the time that the growing tray travels from the top of the water trough to the bottom end, the seeds germinate and the germinated plants grow to maturity. As the growing trays bearing mature plants reach the bottom end of the water trough, the trays are removed and the plants are harvested. The growing trays are then emptied, cleaned restocked and reseeded for return to the top of the water trough and the cycle continues.

In the preferred embodiment of the invention, a plurality of concentric one-piece extruded helical water troughs are arranged upon the support structure to make maximum efficient use of the supporting, land. The support structure provides water/nutrient mixture flow into the trough as well as drain control of the water/nutrient mixture level within the trough. While some use is made of ambient sunlight in the growing process, the use of concentric arrays of helical water troughs in close arrangement may be accommodated by providing artificial lights on the undersides of the water troughs. It will be apparent to those skilled in the art that the size of the helical water trough array may selected to suit a particular locale or need. It will be equally apparent to those skilled in the art that substantial variation of the size and helical parameters of the array may be utilized without departing from the spirit and scope of the present invention. In addition, in the preferred fabrication of the present invention when utilized in growing plants that typically grow a significant height, the spacing between successive layers of the helical trough is increased as layers progress in the downward direction. That is to say, each successive layer of the helical trough is slightly farther beneath the layer above it in the helical array.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
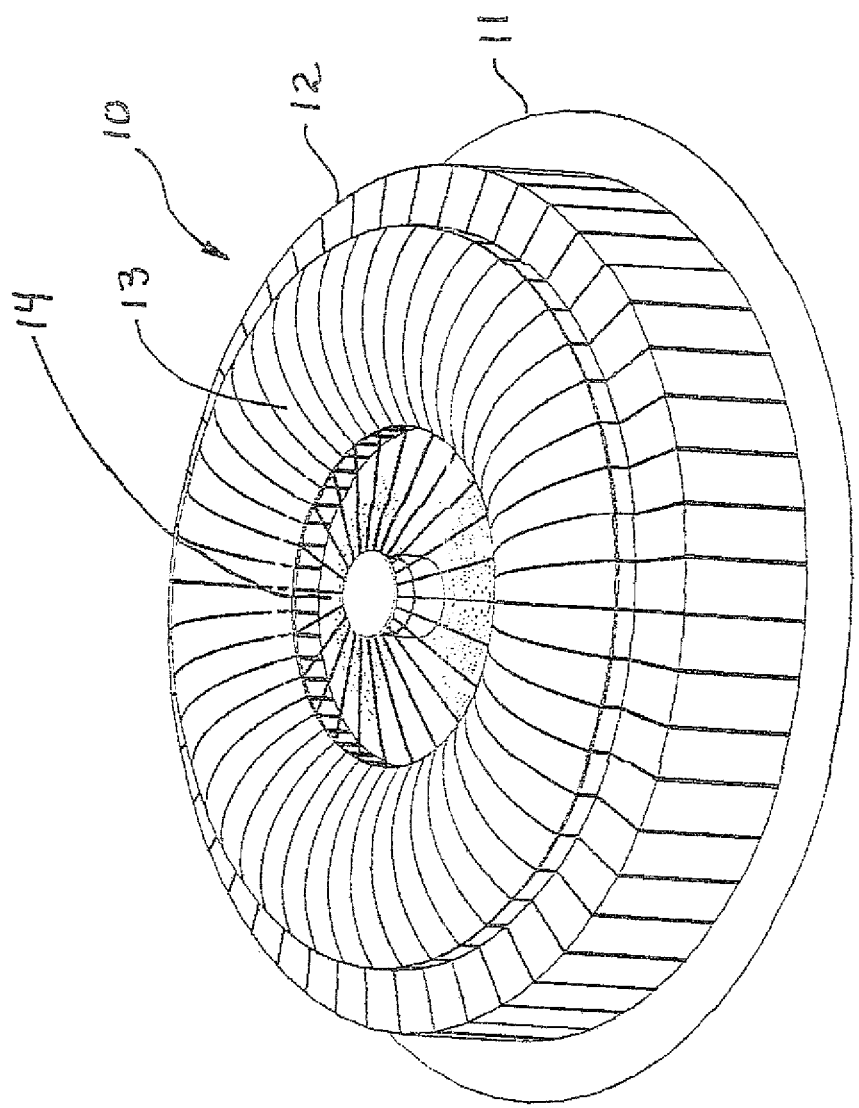
FIG. 1 sets forth a perspective view of an agricultural growing structure constructed in accordance with the present invention.

FIG. 1 sets forth a perspective view of an agricultural growing structure constructed in accordance with the present invention and generally referenced by numeral 10. Structure 10 includes a generally cylindrical array of helical water troughs 12 which are supported upon a base 11. Base 11 is preferably fabricated of a high-strength material such as concrete, or the like. As is better seen in FIG. 10, troughs 12 include a plurality of cylindrical helical water troughs concentrically arranged about a center utility area 14. A light transmissive protective roof 13 covers most of trough array 12.

Figure 2:
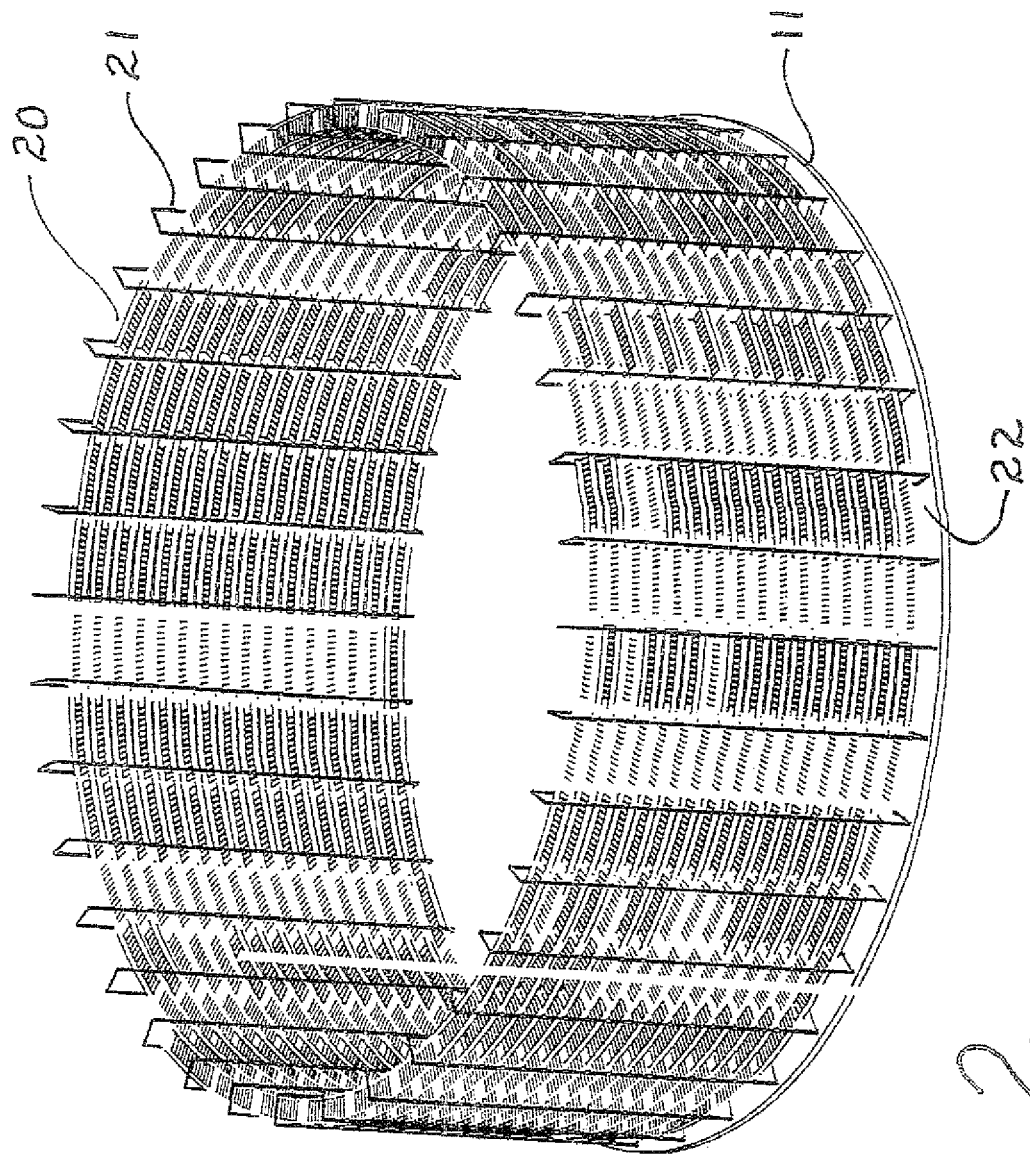
FIG. 2 sets forth a perspective view of a support structure used in an agricultural growing structure constructed in accordance with the present invention.

FIG. 2 sets forth a perspective view of a portion of growing structure 10 showing base 11 supporting a plurality of vertically extending frame supports 21. An outer helical water trough 20 is shown supported by frame supports 21. In accordance with the preferred fabrication of the invention, it will be noted that helical water trough 20 is spaced upwardly above base 11 to create a lower space 22. Space 22 provides a utility area beneath the array of water troughs which is used to move equipment such as transport and service trucks as well as maintenance vehicles to and from various portions of the growing structure.

Figure 3:
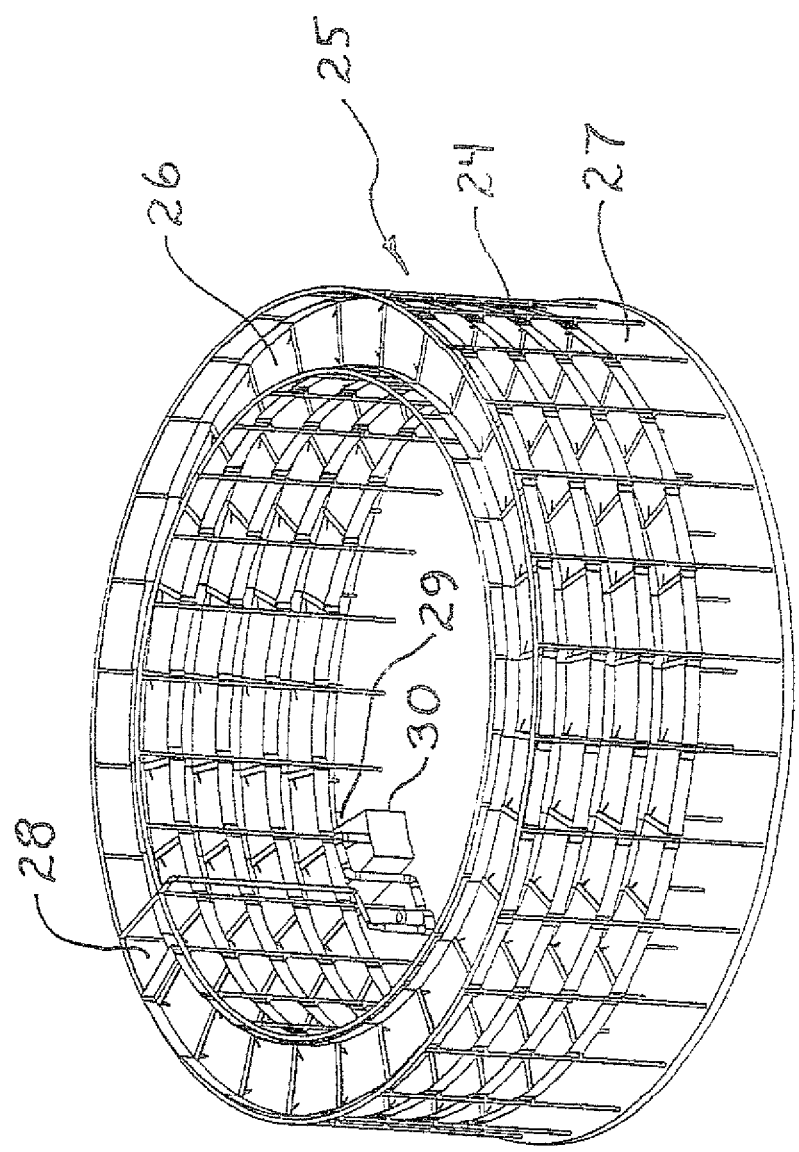
FIG. 3 sets forth a perspective view of a the agricultural growing structure constructed in accordance with the present invention configured to grow fodder.

FIG. 3 sets forth a perspective view of a growing structure constructed in accordance with the present invention which is configured to grow fodder for consumption livestock generally referenced by numeral 25. Growing structure 25 includes a base 27 which supports a vertically extending frame 24. Frame 24 is preferably fabricated of a PVC pipe material shown below in FIG. 11. Of importance to note here is the function of supporting frame 24 as a circulation system by which water is added to or removed from helical water trough 26, helical water trough 26 defines a top portion 28 and a bottom portion 29. As described above growing trays, such as those shown in FIG. 6 fill helical water trough 26 and are moved down water trough 26 as water flows downwardly. As is also described above growing trays bearing seed growing medium are added at top 28 as trays bearing mature fodder plants are removed at bottom 29. The mature fodder is then harvested and placed in feed bin 30 for livestock within the interior of base 27 to feed upon. In this manner structure 25 is "self-contained" in that the livestock within are continuously supplied with fodder produced at bottom 29. While the size of the growing structure may be varied, by way of example, it has been determined that a structure fifty feet in diameter and eighteen feet high will supply fodder sufficient for five hundred cattle.

Figure 4:
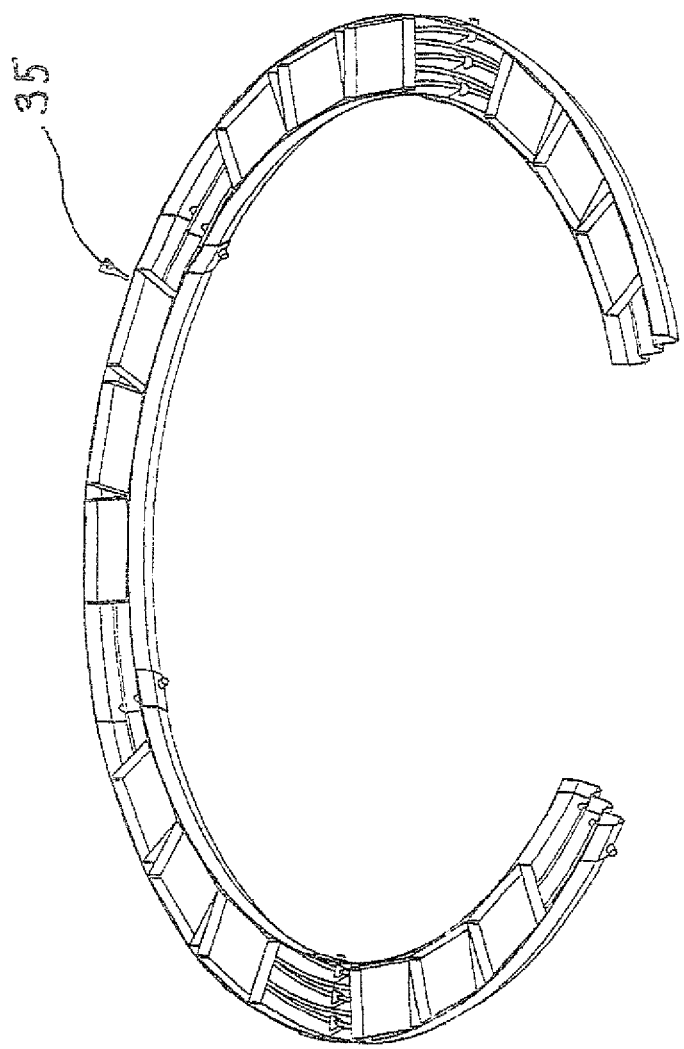
FIG. 4 sets forth a perspective view of an illustrative segment of a helical water trough used in an agricultural growing structure constructed in accordance with the present invention.

FIG. 4 sets forth a perspective view of a single "loop" of helical water trough 26 generally referenced by numeral 35. Of importance to note in FIG. 4 is the use of multiple interlocking growing tray segments used.

Figure 5:
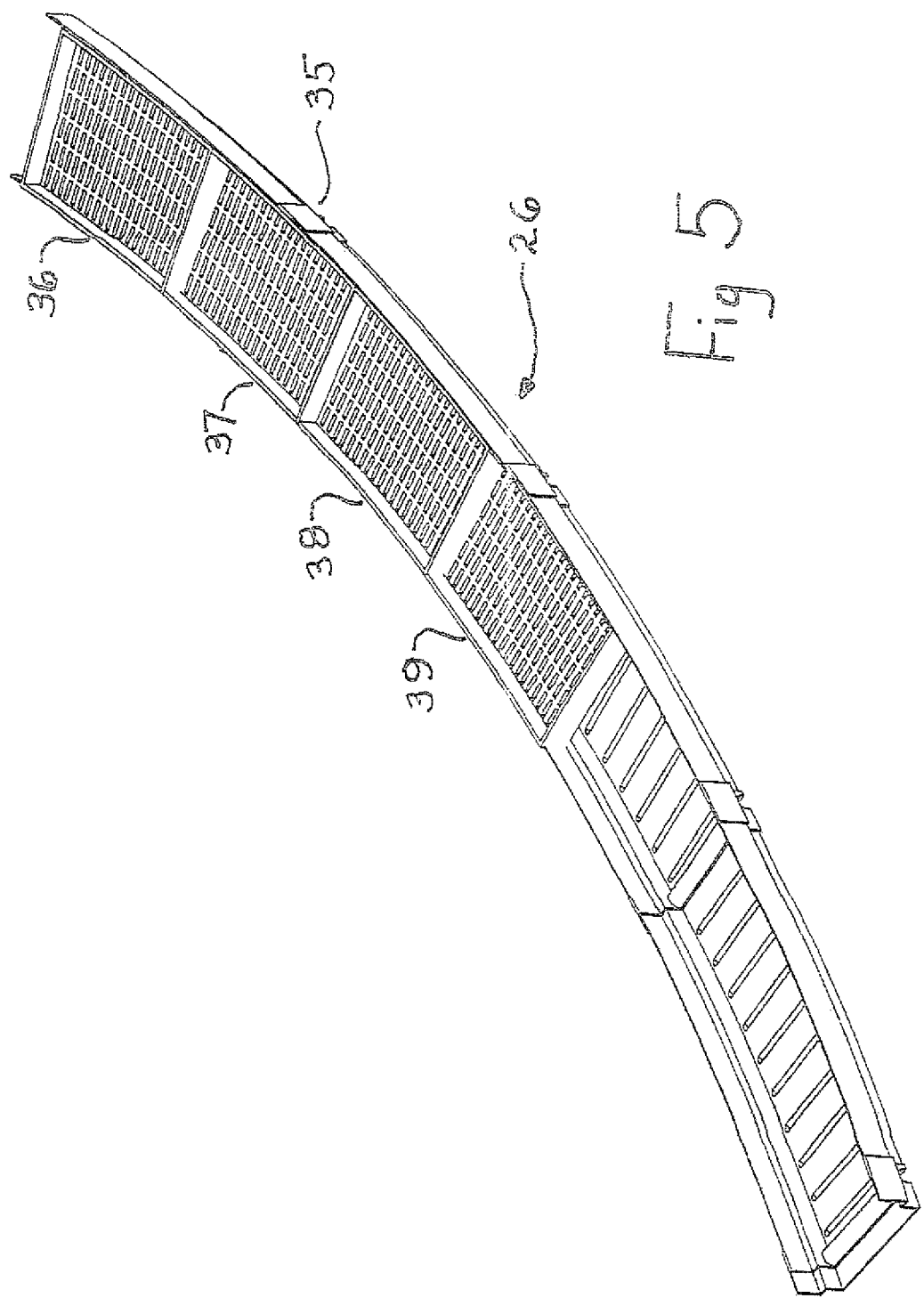
FIG. 5 sets forth a perspective view of an illustrative junction segment of a helical water trough used in an agricultural growing structure constructed in accordance with the present invention.

FIG. 5 shows a portion of helical water trough 26 having a plurality of growing trays 36 through 39 floating therein. It will be recalled that during normal use, floating growing trays will fill the entirety of helical water trough 26 end-to-end.

Figure 6:
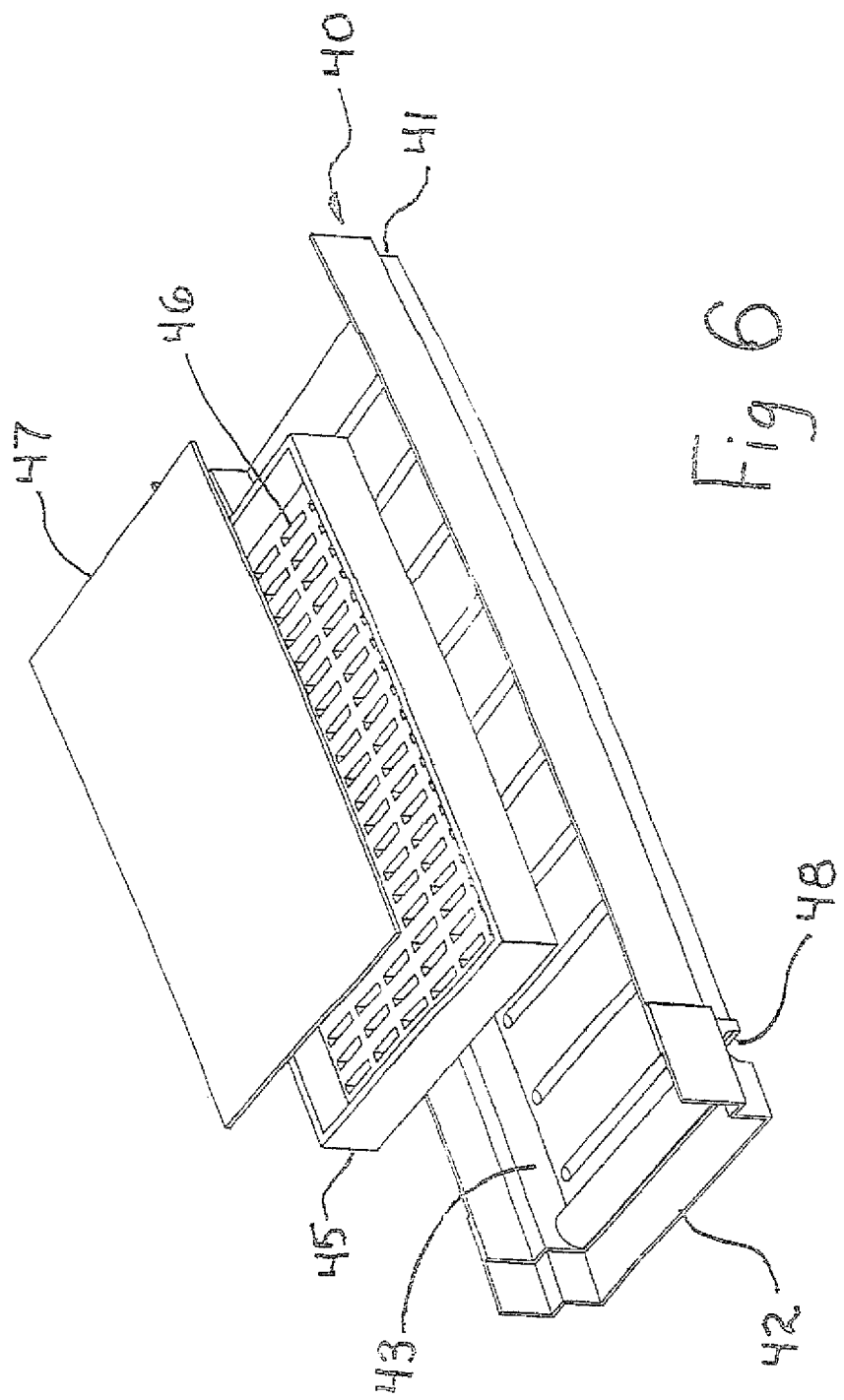
FIG. 6 sets forth a perspective view of an illustrative floating growing tray and growing medium together with a segment of a helical water trough used in an agricultural growing structure constructed in accordance with the present invention.

FIG. 6 sets forth a perspective assembly view of an illustrative segment of helical water trough 26 (seen in FIG. 3). In the water trough section shown in FIG. 6 water trough 26 is constructed using a plurality of arcuate segments serially joined in the manner shown in FIGS. 4 and 5. It will be recalled that the helical water troughs of the present invention may also be constructed of elongated, one-piece, unitary troughs in the manner set forth in the above referenced co-pending application. Returning to FIG. 6, a tray segment 40 defines a water channel 43 and end couplers 41 and 42. End 42 further includes a semi-cylindrical dam 48 which allows end 42 of tray 40 to rest upon and be glued to a pipe frame cross member.

A floating growing tray 45 includes a plurality of transverse water channels and slots 46 which allow water to rise up into the lower portion of tray 45 when the tray is placed within water-filled channel 43 of trough section 40. A Floating growing tray 45 further receives a growing medium 47 which is formed of a soft water absorbent material. In uses such as folder growth, it may be preferred to form growing medium 57 of an edible fiber material. In operations growing other plants, virtually any suitably absorbent material suitable form seed germination and root penetration may be used.

In operation, a plurality of segments are joined end-to-end using the inter locking ends of each tray to form a helical water trough supported within a supporting frame as shown in FIG. 1,2 or 3. Each growing tray is added to the top of the helix as described above. A growing medium is seeded and placed within each growing tray. As the trays travel down the helical water trough, water and nutrients are absorbed up through the slots and channels of the tray into the growing medium. during the time required for a tray to travel to the bottom end of the water trough, the seeds germinate, growing plants which mature to full growth and are harvested as the trays are removed from the bottom end. The growing trays are emptied, cleaned replenished and returned to the top end for reuse.

Figure 7:
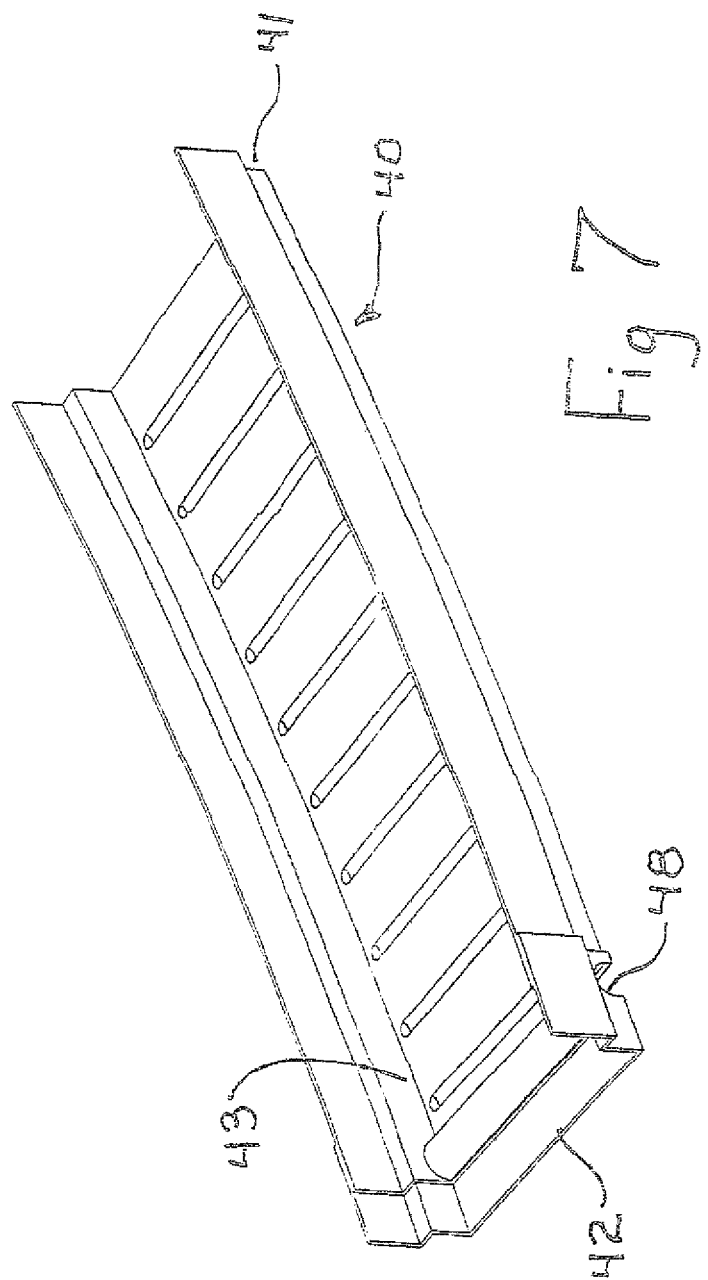
FIG. 7 sets forth a perspective view of an illustrative segment of a water trough used in an agricultural growing structure constructed in accordance with the present invention.
Figure 8:
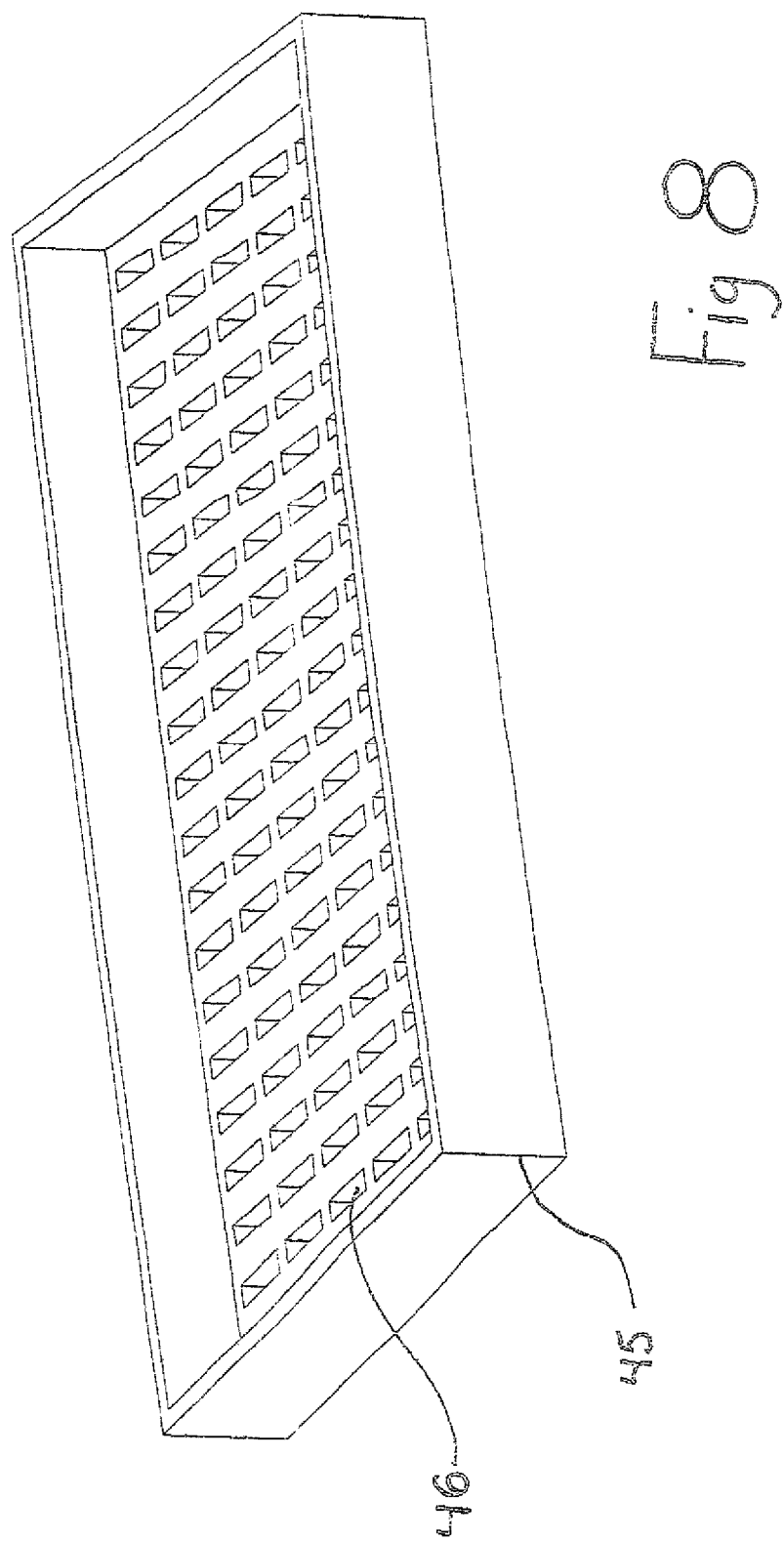
FIG. 8 sets forth a perspective view of an illustrative floating growing tray used in an agricultural growing structure constructed in accordance with the present invention.
Figure 9:
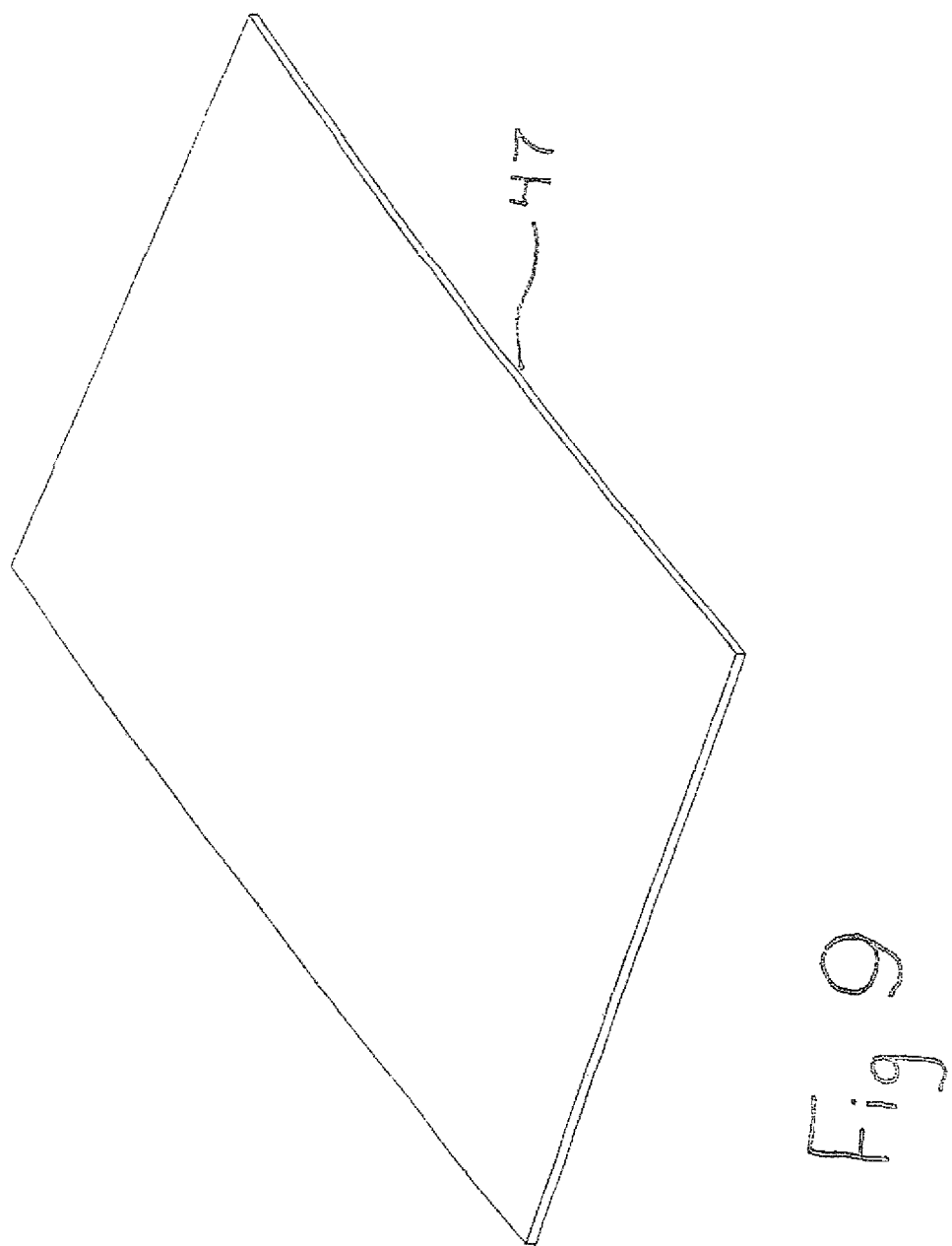
FIG. 9 sets forth a perspective view of an illustrative growing medium used in an agricultural growing structure constructed in accordance with the present invention.

FIGS. 7, 8 and 9 set forth individual perspective views of water trough section 40, floating growing tray 45 and growing medium 47 respectively.

Figure 10:
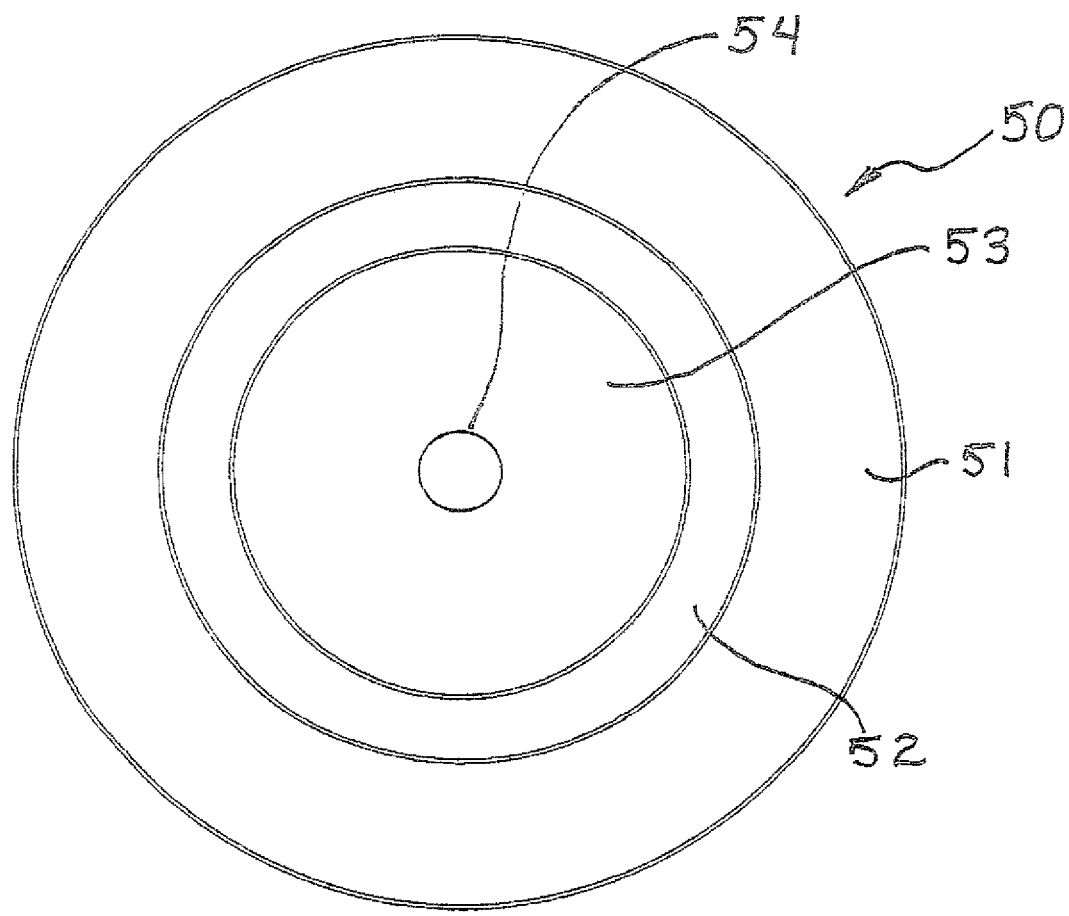
FIG. 10 sets forth a top view of an agricultural growing structure constructed in accordance with the present invention.

FIG. 10 sets forth a top view of an illustrative agricultural growing structure constructed in accordance with the present invention and generally referenced by numeral 50. Growing structure 50 is provided solely as an illustrative example of a complete growing structure. It will be apparent to those skilled in the art that a variety of water trough combinations and sizes may be used without departing from the spirit and scope of the present invention. Thus, in the example shown in FIG. 10, an outer water trough 51 is used to grow fodder while an inward water trough 52 is used to grow a different plant. A further inward water trough 53 is used to maturate fish while a utility and service area is provided at the center. The spacing between layers of the helical water troughs is adjusted for each selected use. For example in fodder growth troughs the spacing is between sixteen and eighteen inches. In most other plant growth a four foot spacing is typical. For fish environments a spacing of eight feet is typical. By way of example, a typical growing structure constructed in accordance with the present invention having a diameter of three hundred thirty feet and an overall height that accommodates six story helical water troughs will provide the growing equivalent of five thousand acres of conventional farmland agriculture.

Figure 11:
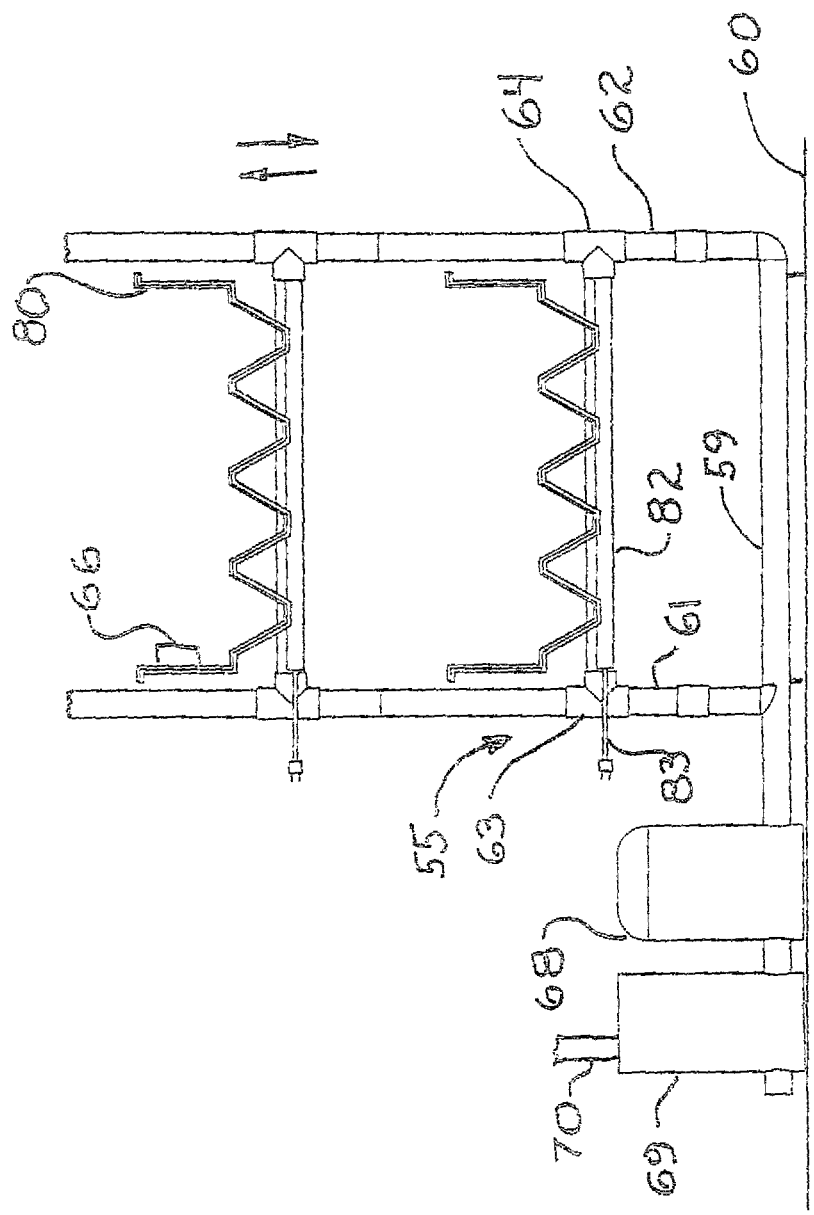
FIG. 11 sets forth a partial view of an illustrative support structure used in an agricultural growing structure constructed in accordance with the present invention.

FIG. 11 sets forth a partial side elevation view of a supporting frame structure which includes water transporting frame members. While a support structure formed solely of pipe elements may be utilized, it is anticipated that a combination of steel frame and pipe frame structures will likely prove optimum for most uses. The clear advantage of pipe frame structures is found in their ability to circulate water within the helical water troughs.

More specifically, a base 60 preferably formed a material such as concrete provide support for a plurality of vertical structures such as structure 55. Structure 55 includes a horizontal member which, in turn, supports a pair of spaced apart vertical members 61 and 62. A pair of T-couplers 63 and 64 are positioned upon vertical members 61 and 62 respectively. A cross member 67 couples T-couplers 63 and 64. A pump 68 is coupled to a filter 69 which, in turn, is coupled to a water return and supply pipe 70. A trough section 80 includes a dam (see dam 47 in FIG. 6) which receives cross member 67. Dam 81 and cross member 67 define pluralities of apertures which allow water to flow between cross member 67 and trough section 80 to maintain the desired water level within trough section 80 and to provide a water flow that moves floating growing trays such as tray 80. Preferably, dam 81 is glued to cross member 67 to provide a water-tight seal therebetween. The stacked array of helical troughs forming helix 20 requires that artificial light be used or at least available to supplement the natural light which the various agricultural plants require for proper growth. Accordingly, in the preferred fabrication of the present invention a plurality of electric lights are supported on the undersides of the trough sections. By way of example, FIG. 11 shows light 82 supported on the underside of trough section 80 together with an electrical, power connecting wires set 83. Wire set 83 will be understood to be coupled to an available source of electric power (not shown).

Figure 12:
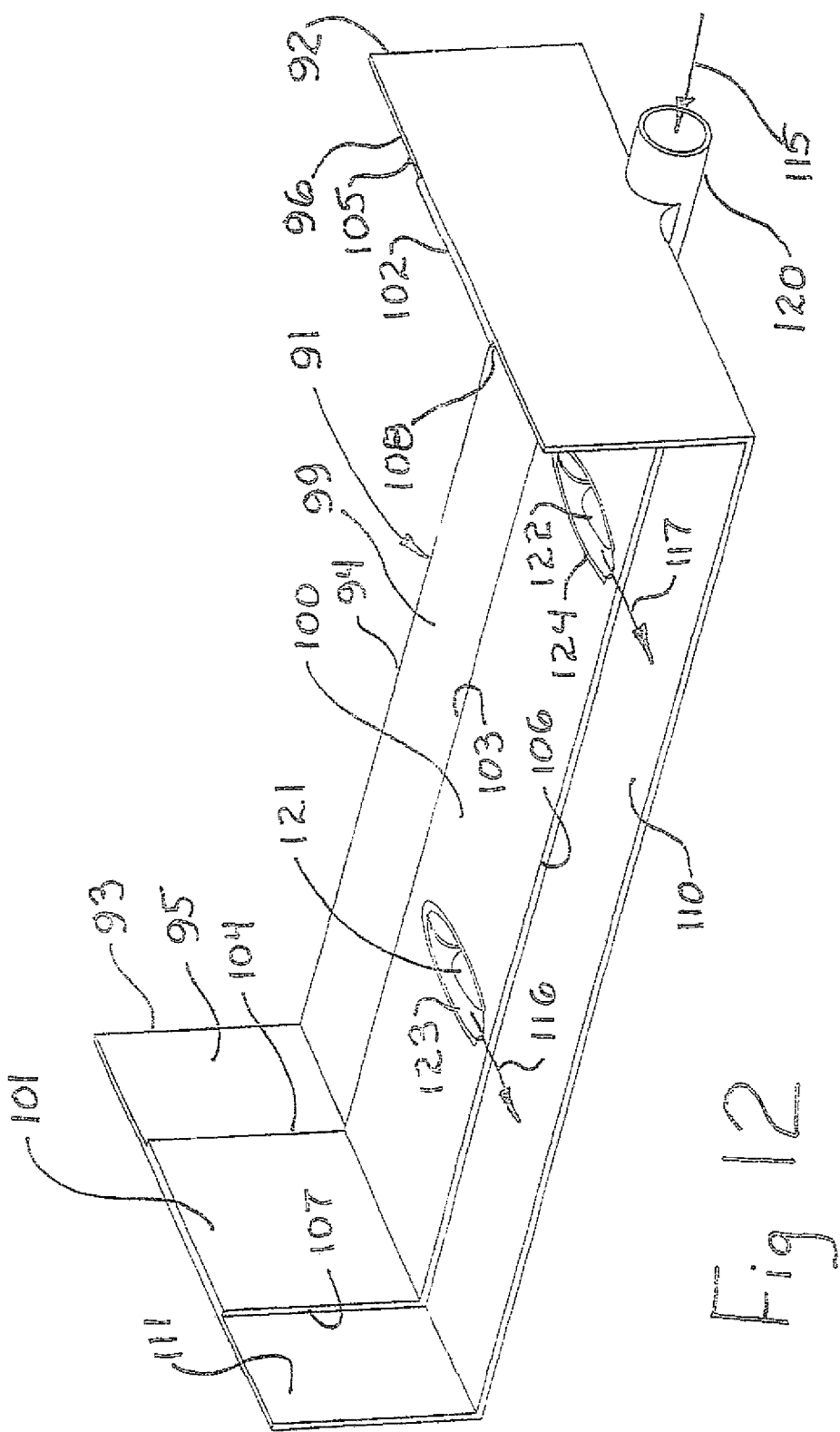
FIG. 12 sets forth a perspective view of a trough junction support utilized in connecting trough sections within the present invention agricultural growing structure.

FIG. 12 sets forth a perspective view of a trough junction support constructed in accordance with the present invention and generally referenced by numeral 90. Trough support 90 includes a base 91 having a horizontal crossplate 94 and a pair of upwardly extending sidewalls 92 and 93. Crossplate 94 and sidewalls 92 and 93 form a generally U-shaped base support. Crossplate 94 defines a pair of horizontal surfaces 99 and 100 tan and a raised portion 100 extending therebetween. Similarly, sidewall 93 defines sidewall surfaces 95 and 111 on each side of a raised sidewall portion 101. Sidewall 92 is identical to sidewall 93 and includes sidewall surfaces 96 and 112 on each side of a raised sidewall portion 102. Raised portion 100 defines parallel edges 103 and 106 while raised sidewall portion 101 defines edges 104 and 107. Similarly, raised sidewall portion 102 defines edges 105 and 108. Trough junction support 90 further includes a crosspipe 120 secured upon the underside of cross plate 94. Raised portion 100 defines a pair of elongated apertures 123 and 124. Crosspipe 120 further supports a pair of discharges 121 and 122 (better seen in FIG. 14). In the anticipated operation of the present invention agriculturally growing structure, a plurality of trough junction supports, such as trough junction support 90, are secured to water carrying pipe structures in the manner described above. As is also described above the use of water carrying pipe structures for supporting the helical trough and the pluralities of trough junction supports greatly increases the efficiency of the present invention agricultural growing structure. Accordingly, in the example shown in FIG. 12, the introduction of water flow into crosspipe 120 in the direction indicated by arrow 115 allows discharges 121 and 122 to divert a portion of water flowing through crosspipe 120 upwardly through apertures 123 and 124 respectively thereby producing a water flow within the helical trough (seen in FIG. 17) in the directions indicated by arrows 116 and 117. In this manner, trough junction support 90 performs three concurrent functions within the present invention agricultural growing structure. First, crosspipe 120 (as is better seen in FIG. 17) extends between the trough support structure on either side of the trough thereby providing physical support for the trough. Second, crosspipe 120 carries rater flow from one side of the pipe support structure to the other forming a portion of the water circulation system. Finally, trough junction support 90 introduces water flow into the helical trough that adds water to the trough and enhances the directional flow of the water within the trough as it carries the floating trays through the helical array.

Figure 13:
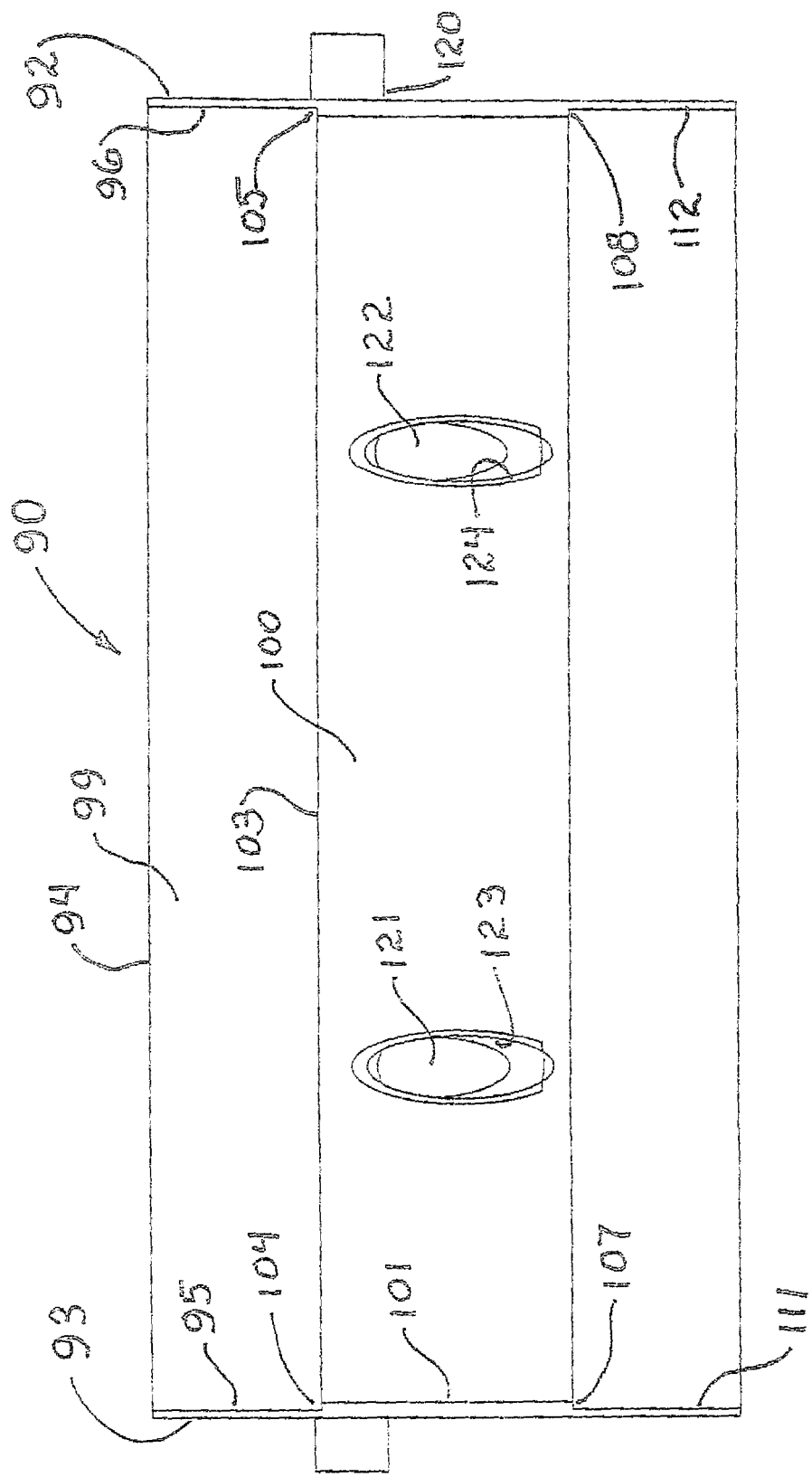
FIG. 13 sets forth a top view of the trough junction support shown in FIG. 12.

FIG. 13 sets forth a top view of trough junction support 90. As described above, trough support 90 includes a base 91 having a horizontal crossplate 94 and a pair of upwardly extending sidewalls 92 and 93. Crossplate 94 and sidewalls 92 and 93 form a generally U-shaped base support. Crossplate 94 defines a pair of horizontal surfaces 99 and 110 and a raised portion 100 extending therebetween. Similarly, sidewall 93 defines sidewall surfaces 95 and 111 on each side of a raised sidewall portion 101. Sidewall 92 is identical to sidewall 93 and includes sidewall surfaces 96 and 112 on each side of a raised sidewall portion 102. Raised portion 100 defines parallel edges 103 and 106 while raised sidewall portion 101 defines edges 104 and 107. Similarly, raised sidewall portion 102 defines edges 105 and 108. Trough junction support 90 further includes a crosspipe 120 secured upon the underside of cross plate 94. Raised portion 100 defines a pair of elongated apertures 123 and 124. Crosspipe 120 further supports a pair of discharges 121 and 122 (better seen in FIG. 14).

Figure 14:
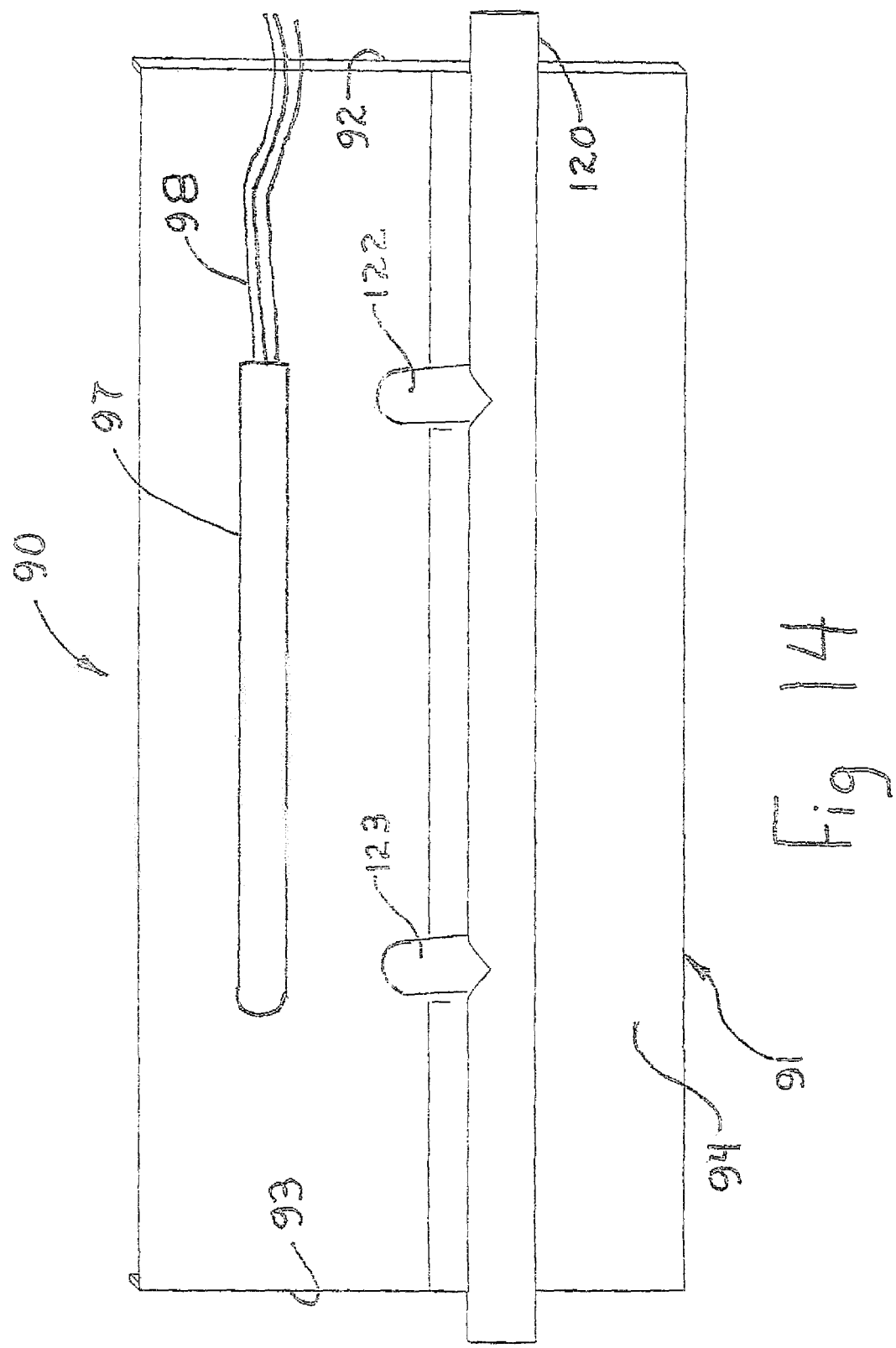
FIG. 14 sets forth a bottom view of the trough junction support shown in FIG. 12.

FIG. 14 sets forth a bottom view of trough junction support 90. Trough junction support 90 includes base 91 having generally planar crossplate 94. Cross plate 94 supports sidewalls 92 and 93. Cross pipe 120 is joined to the bottom surface of crossplate 94 and includes upwardly angled discharges 122 and 123. A supplemental electric light 97 is supported upon the undersurface of plate 94 and is coupled to an external power source (not shown) by coupling wires 98. As mentioned above the present invention structure preferably utilizes a plurality of electric lights which are able to provide additional light within the helical array of the agricultural growing structure to supplement the natural light provided and accommodate the vertical stacking of the helical trough structure.

Figure 15:
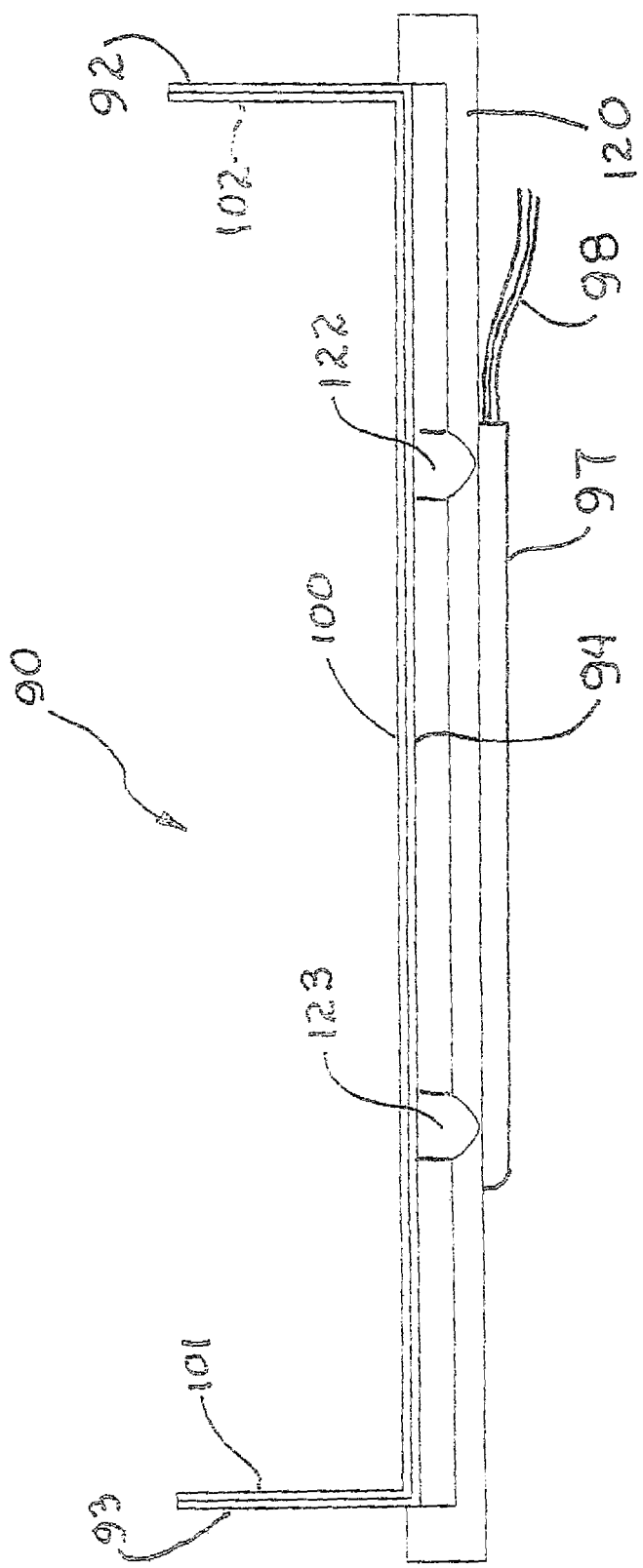
FIG. 15 sets forth an end view of the trough junction support shown in FIG. 12.

FIG. 15 sets forth an end view of trough junction support 90. Trough junction support 90 includes base 91 having generally planar crossplate 94. Crossplate 94 supports sidewalls 92 and 93. Crosspipe 120 is joined to the bottom surface of crossplate 94 and includes upwardly angled discharges 122 and 123. A supplemental electric light 97 is supported upon the undersurface of plate 94 and is coupled to an external power source (not shown) by coupling wires 98. Crossplate 94 further supports a raised portion 100 while sidewalls 92 and 93 support raised portions 102 and 101 respectively.

Figure 16:
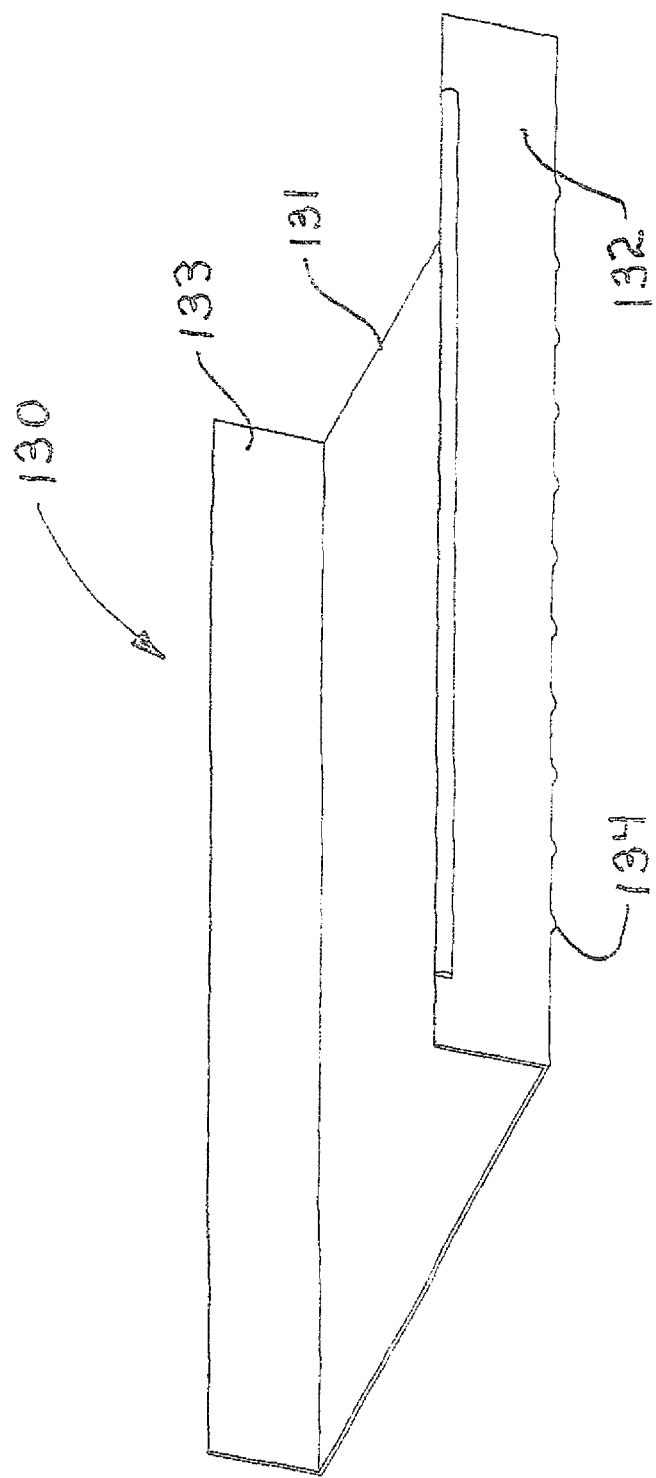
FIG. 16 sets forth a perspective view of an illustrative trough section utilized in the present invention agricultural growing structure.

FIG. 16 sets forth a perspective view of an illustrative trough section generally referenced by numeral 130. Trough section 130 will be understood to be generally representative of the plurality of trough sections which are coupled between a corresponding plurality of trough junction supports such as trough junction support 90 shown in FIG. 12 above. It will be apparent to those skilled in the art that the length of trough sections utilized in the present invention helical architectural growing structure is to some extent a matter of design choice. It has been found generally advantageous to utilize trough sections having lengths between four and 6 feet. However, it will be apparent to those skilled in the art that in response to the conditions of operation and other factors, trough sections of different lengths may be utilized without departing from the spirit and scope of the present invention.

Trough section 130 includes a generally planar bottom 131 together with upwardly extending sidewalls 132 and 133. As a result, trough section 130 forms a generally squared U-shaped trough. Trough section 130 further includes a plurality of reinforcing ribs 134 which extend from side to side on the undersurface of bottom 131. Reinforcing ribs 134 are operative to strengthen the trough as it supports a volume of water passing through and supported by the trough.

Figure 17:
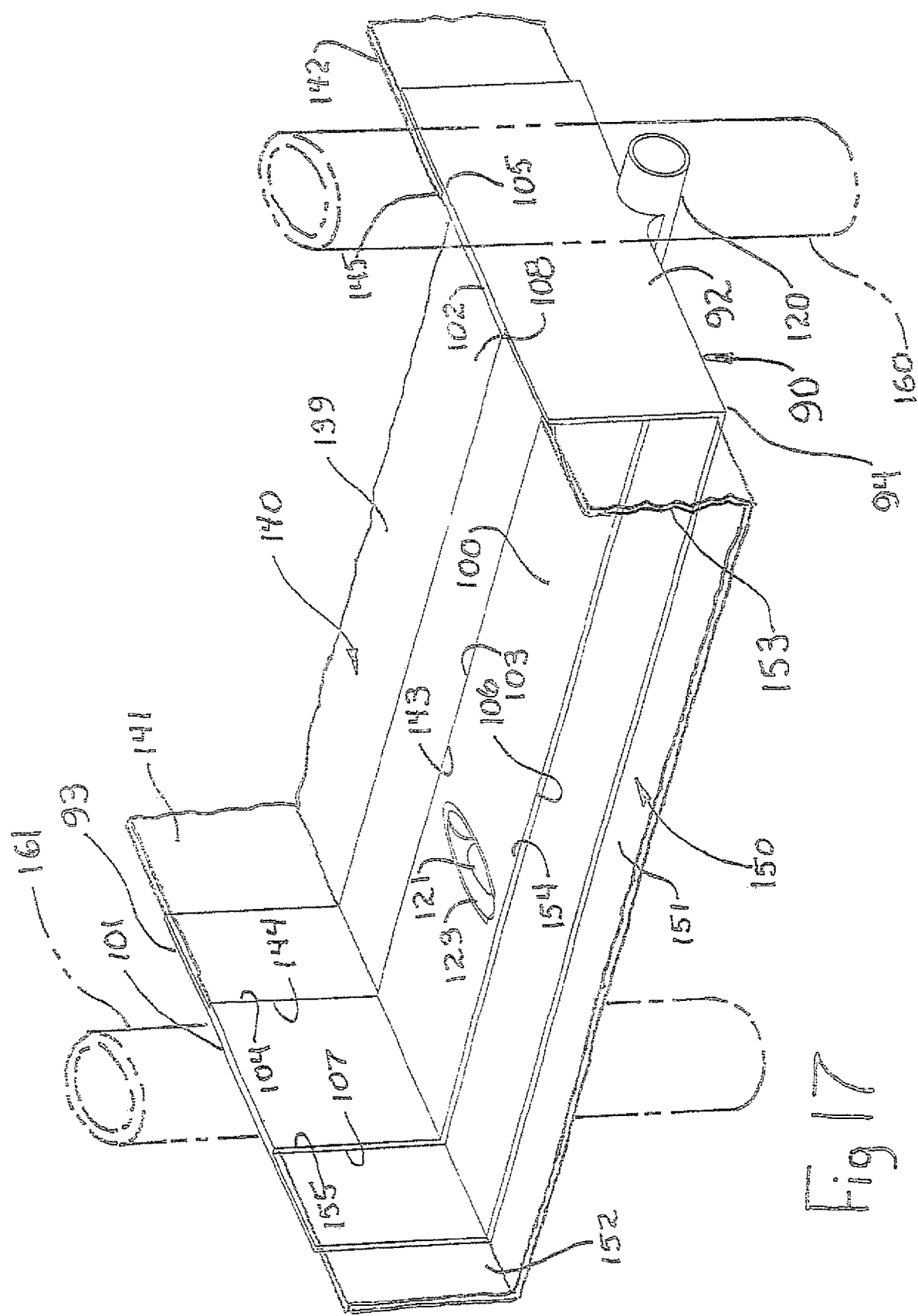
FIG. 17 sets forth a perspective view of the trough junction support shown in FIG. 12 having a pair of trough sections coupled thereto.

FIG. 17 sets forth a perspective view of a typical trough junction in which a pair of trough sections are supported by a trough junction support. More specifically, trough junction support 90 includes crossplate 94 which supports upwardly extending sidewalls 92 and 93 Crossplate 94 supports raised portion 100 while sidewalls 92 and 93 support raised portions 102 and 101 respectively. Raised portion 100 defines edges one 103 and 106. Raised portion 102 of sidewall 92 defines edges 105 and 108. Raised portion 101 of sidewall 93 defines edges 104 and 107.

A trough section 140 includes a bottom 139 and a pair of sidewalls 141 and 142. Bottom 139 of trough section 140 defines an edge 143 while sidewalls 141 and 142 define respective edges 144 and 145. A trough section 150 includes a bottom 151 and a pair of sidewalls 152 and 153. Bottom 151 defines an edge 154 while sidewalls 152 and 153 define respective edges 155 and 156. Trough junction support 90 further includes crosspipe 120 joined to the undersurface of crossplate 94. A pair of pipe supports 160 and 161 are shown in phantom line depiction and represent an illustrative trough support structure within which trough junction support 90 is secured. Pipe supports 160 and 161 are coupled to opposed ends of crosspipe 120. In accordance with the preferred fabrication of the present invention, pipe supports 160 and 161 provide the mechanical support for trough junction support 90 while also providing water flow into crosspipe 120.

Trough section 140 is received within one side of trough junction support 90 such that edges 143, 144 and 145 are brought into abutment with edges 103, 104 and 105 of raised portion 100. This abutment of edges ensures that water flowing from trough section 140 across raised portion 100 will flow and not leak. Similarly, the abutment of edges 106, 107 and 108 of raised portion 100 and edges 154, 155 and 156 of trough section 150 provides a leak proof seal for trough section 150. As a result, water flowing through the junction of trough sections 140 and 150 provided by trough junction support 90 flows freely and unimpeded. It will be apparent to those skilled in the art that the resulting structure in which the helical trough of the present invention is formed of multiple trough sections joined by multiple trough junction supports in the manner shown in FIG. 17 provides a continuous controllable water flow which readily carries the floating trays of the present invention hydroponic agricultural structure.

Figure 18:
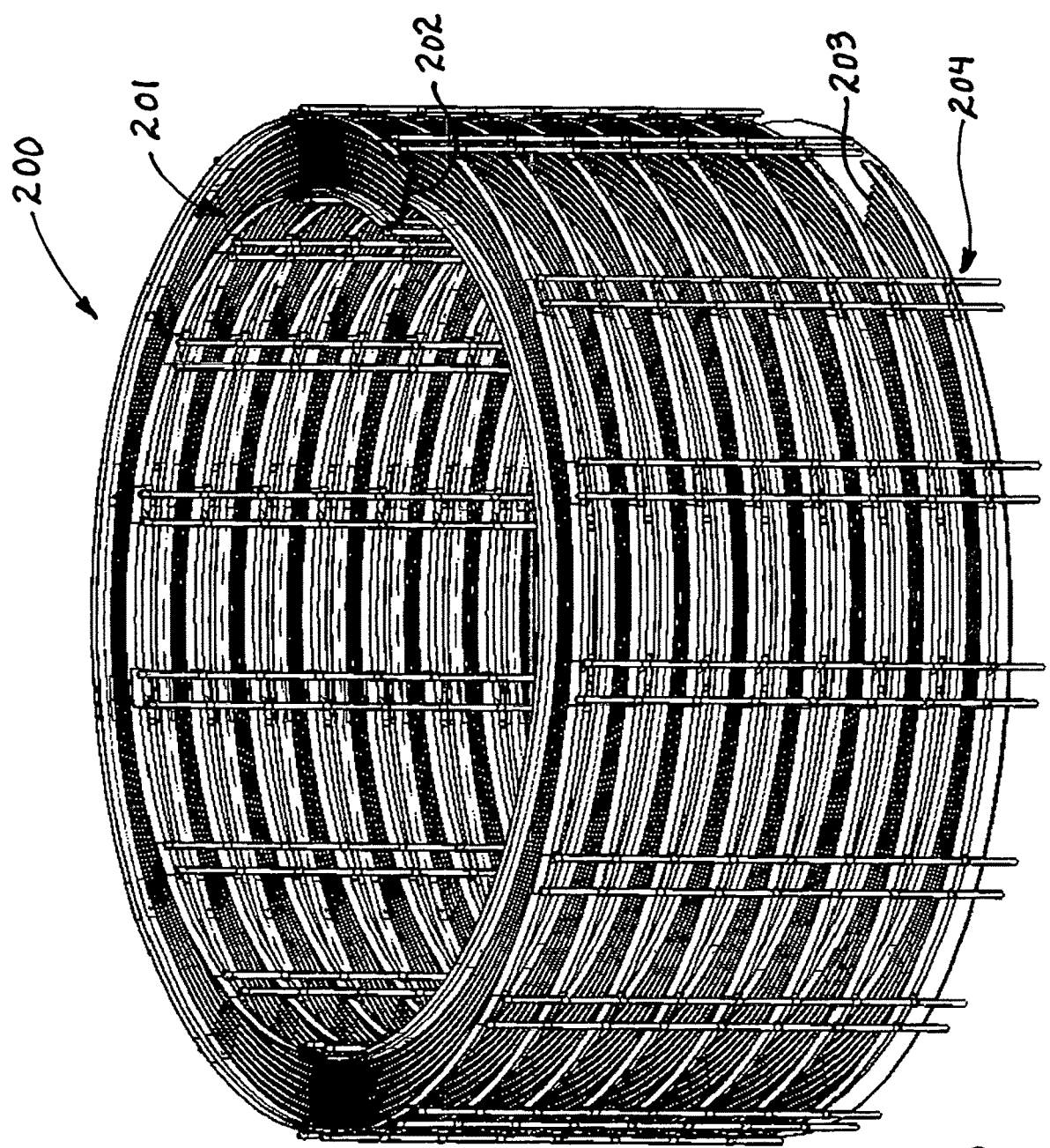
FIG. 18 sets forth a perspective view of an alternate embodiment of the present invention agricultural growing structure having a one-piece helical trough.

FIG. 18 sets forth a perspective view of an alternate embodiment of the present invention agricultural growing structure generally referenced by numeral 200. By way of overview, agricultural growing structure 200 differs primarily from agricultural structure 10 set forth above in FIGS. 1 through 17 in that the multiple segment helical trough of agricultural growing structure 10 is replaced by a one-piece extruded helical trough. In addition, an alternative form of circulation apparatus for circulating the water/nutrient mixture throughout the helical trough is also utilized.

More specifically, agricultural growing structure 200 includes a helical one-piece trough 201 supported by a plurality of trough supports 204. As mentioned above and in accordance with an important aspect of the embodiment of the present invention set forth in FIGS. 18 through 24, trough 201 is a single extruded one-piece helical structure formed in accordance with the apparatus set for in the above referenced incorporated co-pending related application Ser. No. 16/181,305 entitled CONSTRUCTION APPARATUS AND METHOD FOR AGRICULTURAL GROWING STRUCTURE. While the construction of helical trough 201 is amply set forth in the descriptions and illustrations therein which are incorporated herein by reference, suffice it to note here that helical trough 200 comprises a single integrally formed helical structure having an upper end 202, a lower end 203 and a continuous uninterrupted helical trough spiraling downwardly therebetween. Helical trough 201 is supported at selected points about the helical structure by a plurality of trough supports 204. The structures of trough supports 204 are set forth below in greater detail in FIGS. 20 through 24. However, suffice it to note here that each of trough supports 204 comprises a pair of feed supports positioned on opposite sides of trough 201 and a pair of drain supports also positioned on opposite sides of trough 201. While not shown in FIG. 18, it will be understood that agricultural growing structure 200 includes appropriate apparatus for adding a succession of floating growing trays such as trays 36, 37, 38 and 39 shown in FIG. 5 and tray 45 shown in FIG. 6 at upper end 202 together with apparatus for removing floating growing trays from lower end 203 following their transit of trough 201.

Figure 19:
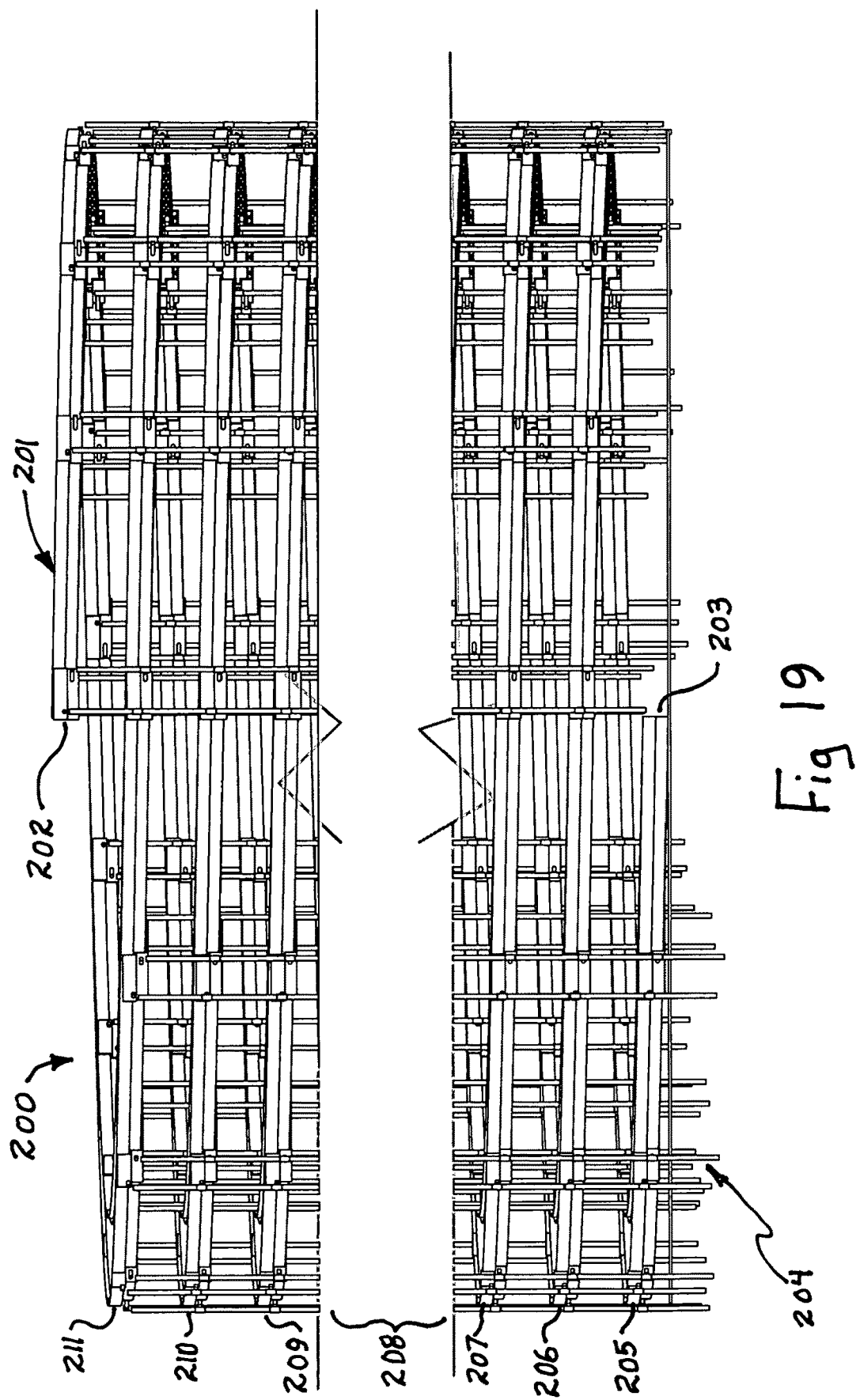
FIG. 19 sets forth a side elevation view of the one-piece helical trough alternate embodiment of the present invention agricultural growing structure set forth in FIG. 18.

FIG. 19 sets forth a side elevation view of agricultural growing structure 200. As described above, agricultural growing structure 200 includes a helical trough 201 supported by a plurality of trough supports 204. The latter are spaced at selected intervals along the length of helical trough 201 and are fabricated in the manner set forth below in greater detail. It will be noted that trough supports 204 are positioned within growing structure 202 insure the desired circulation of the water/nutrient mixture throughout helical trough 201. Additionally, further support structures (not shown) which need not include the feed pipes and drainpipes provided by trough supports 204 but rather provide simpler weight supporting structures may be utilized between trough supports 204 as needed. As is also described above, trough 201 includes an upper end 202 and a lower end 203. FIG. 19 sets forth a plurality of tiers of trough 201 extending upwardly from the bottom of agricultural growing structure 200 referenced by numerals 205, 206 and 207. FIG. 19 also shows a plurality of upper tiers referenced by numerals 209, 210 and 211. An indeterminate space referenced by numeral 208 is shown between tiers 207 and 209 to illustrate the point that trough 201 may be fabricated of various numbers of helical turns and may include various numbers of tiers without departing from the spirit and scope of the present invention. Thus, indeterminate space 208 represents virtually any number of tiers extending between tiers 207 and 209 of trough 201.

Figure 20:
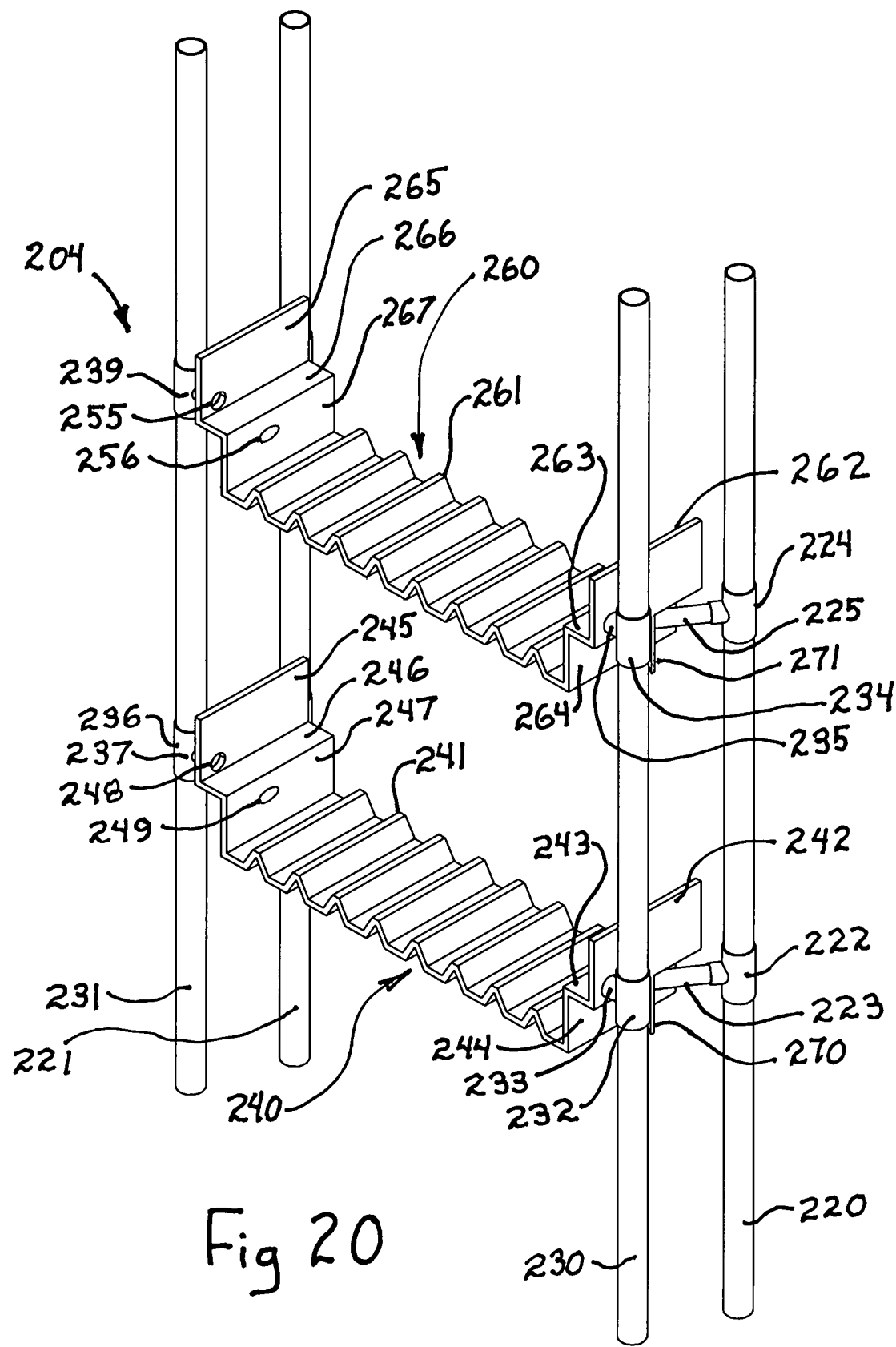
FIG. 20 sets forth a perspective view of a portion of the support structure utilized in the one-piece helical trough alternate embodiment of the present invention agricultural growing structure.
Figure 21:
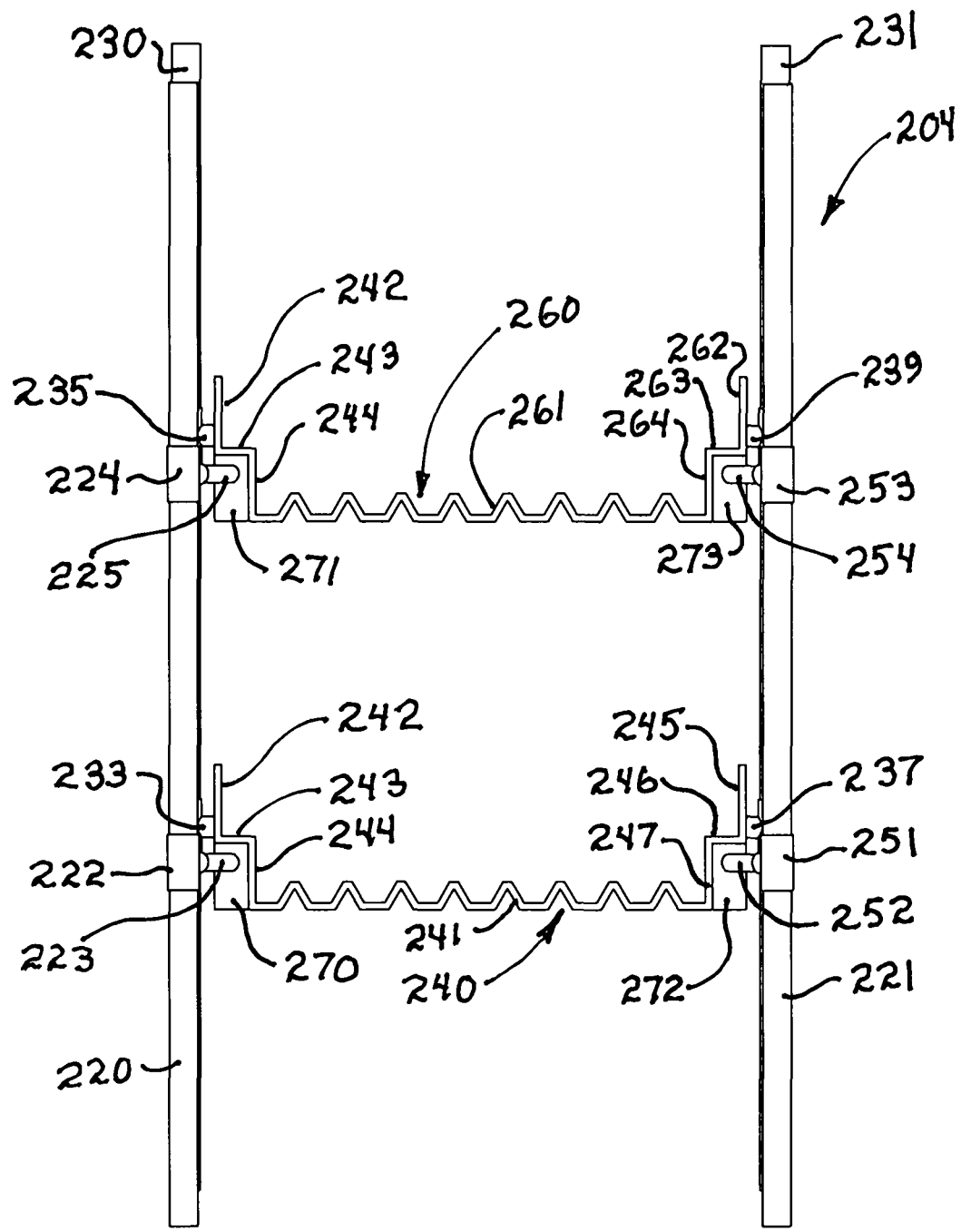
FIG. 21 sets forth a rear view of a portion of the support structure utilized in the one-piece helical trough alternate embodiment of the present invention agricultural growing structure.

FIG. 20 sets forth a perspective view of a portion of a support structure typical of trough support 204 set forth above and utilized in supporting one-piece helical trough 201 within agricultural growing structure 200. With temporary reference to FIG. 19, it will be noted that each of trough supports 204 support multiple tiers of trough 201. Accordingly, FIG. 20 shows a portion of a typical trough support illustrating a pair of trough support brackets 240 and 260 utilized in providing the support of two tiers of trough 201. Trough support brackets 240 and 260 are each secured to the feed pipes and drain pipes on each end of the trough, support brackets. It will be understood that the structure set forth in FIG. 20 is representative of the multiplicity of supporting structures utilized for each of the tiers forming trough 201. Thus, it will be further understood that the structure set forth in FIGS. 20, 21 and 22 illustrate such support structures and the descriptions thereof apply equally well to each of the support structures within agricultural growing structure 200.

Figure 22:
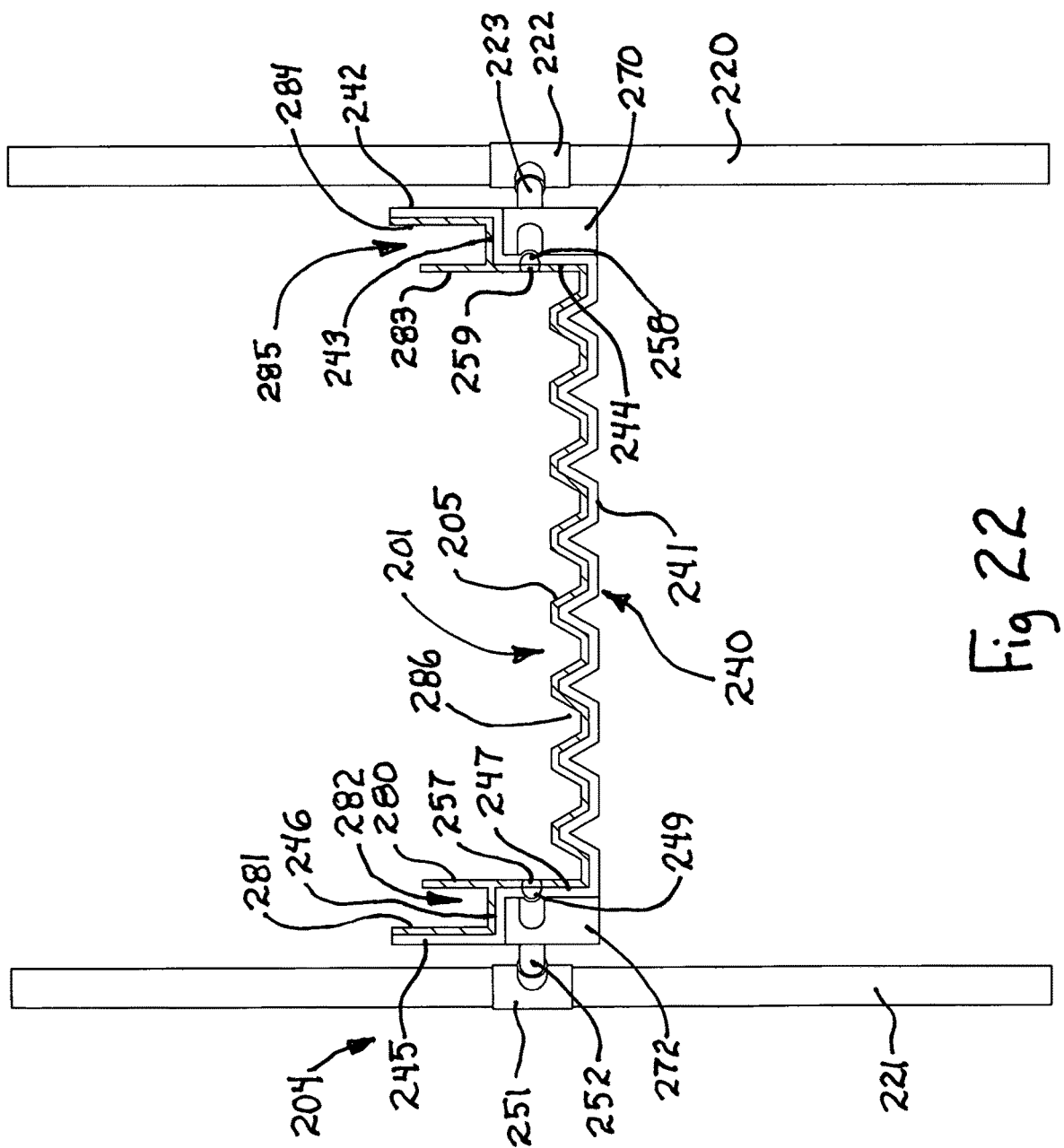
FIG. 22 sets forth a section, view of a portion of the trough support structure supporting a portion of the one-piece helical trough alternate embodiment of the present invention agricultural growing structure.

Trough support 204 includes a pair of feed pipes 220 and 221 positioned on opposite sides of trough 201 (seen in FIG. 22). Trough support 204 further includes a pair of drain pipes 230 and 231 also spaced on opposite sides of trough 201 (seen in FIG. 22). Drain pipe 230 includes a T-fitting 232 and a T-fitting 234 spaced in accordance with the anticipated tier spacing desired for trough 201 (seen in FIG. 22). Similarly, drain pipe 231 includes a T-fitting 236 and a T-fitting 238 also spaced in accordance with the anticipated tier spacing of trough 201 (seen in FIG. 22). In further similarity, feed pipe 220 includes a T-fitting 222 and a T-fitting 224 spaced in accordance with the anticipated tier spacing of trough 201 (seen in FIG. 22). Finally, feed pipe 221 includes a T-fitting 222 and a T-fitting 224 (seen in FIG. 21) in accordance with the anticipated tier spacing of trough 201 (seen in FIG. 22).

Trough support bracket 240 includes a corrugated crossmember 241 extending between feed pipe 220 and drain pipe 230 on one side and feed pipe 221 and drain pipe 231 on the opposite side. Trough support bracket 240 includes a vertical wall 244, a horizontal step 243 and a vertical wall 242. Trough support bracket 240 further includes a vertical wall 247 a horizontal step 246 and a vertical wall 245. Wall 245 defines a drain aperture 248. Wall 247 defines a feed aperture 249. A drain pipe 237 extends from T-fitting 236 to drain aperture 248. As is better seen in FIG. 21, a distribution pipe 252 extends from T-fitting 251 into feed aperture 249. In this manner, wall 247 and wall 245 are secured to feed pipe 221 and drain pipe 231 thereby securing one end of trough support bracket 240. While not seen in FIG. 20, it will be understood that wall 244 defines a similar aperture to feed aperture 249 and that wall 242 defines a drain aperture similar to drain aperture 248 formed in wall 245. Accordingly, the attachment of trough support bracket 240 is completed by a drain tube 233 extending from T-fitting 232 into the drain aperture formed in wall 242 and a distribution pipe 233 extending from T-fitting 222 into the feed aperture formed in wall 244. It will be noted that in the preferred fabrication of the present invention crossmember 241 is corrugated to correspond to the corrugation of the helical trough which it supports. However, it will be apparent to those skilled in the art that crossmember 241 may, in some instances, be fabricated as a simple planar member rather than incorporating the corrugated structure without departing from the spirit and scope of the present invention.

Trough support bracket 260 is substantially identical to trough support bracket 240 and includes a corrugated crossmember 261 extending between feed pipe 220 and drain pipe 230 on one side and feed pipe 221 and drain pipe 231 on the opposite side. Trough support bracket 260 includes a vertical wall 264, a horizontal step 263 and a vertical wall 262. Trough support bracket 260 further includes a vertical wall 267 a horizontal step 266 and a vertical wall 265. Wall 265 defines a drain aperture 255. Wall 267 defines a feed aperture 256. A drain pipe 239 extends from T-fitting 238 to drain aperture 255. As is better seen in FIG. 21, a distribution pipe 254 extends from T-fitting 253 into feed aperture 256. In this manner, wall 267 and wall 265 are secured to feed pipe 221 and drain pipe 231 thereby securing one end of trough support bracket 260. While not seen in FIG. 20, it will be understood that wall 264 defines a similar aperture to feed aperture 256 and that wall 262 defines a drain aperture similar to drain aperture 255 formed in wall 265. Accordingly, the attachment of trough support bracket 260 is completed by a drain tube 239 extending from T-fitting 232 into the drain aperture formed in wall 262 and a distribution pipe 254 extending from T-fitting 253 into the feed aperture formed in wall 264.

FIG. 21 sets forth a rear view of the portion of trough support 204 seen in FIG. 20. As described above, trough support 204 includes a pair of feed pipes 220 and 221 together with a pair of drain pipes 230 and 231 positioned on opposite sides of trough support brackets 240 and 260. As is also described above, feed pipe 221 supports a pair of T-fittings 251, and 253. Feed pipe 220 supports a pair of T-fittings 222 and 224. Trough support bracket 240 includes a corrugated crossmember 241. Trough support bracket 240 further includes a vertical wall 244, a horizontal step 243 and a vertical wall 244. Trough support bracket 240 further includes a vertical wall 247, a horizontal step 246 and a vertical wall 245. Trough support bracket 240 further includes a flange 270 and a flange 272. Flange 270 is joined to vertical wall 244 and horizontal step 243 to provide strengthening of trough support bracket 240. Similarly, flange 272 is joined to vertical wall 247 and horizontal step 246 to provide further strengthening of trough support bracket 240. A distribution pipe 223 extends from T-fitting 222 through flange 270 and a feed aperture (not shown) formed in wall 244. A drain tube 233 extends from T-fitting 232 through an aperture (not shown) formed in wall 242. A distribution pipe 252 extends from T-fitting 251 through flange 272 and through feed aperture 249 (seen in FIG. 20) formed in vertical wall 247. A drain pipe 237 extends from T-fitting 236 through drain aperture 248 (seen in FIG. 20) formed in vertical wall 245.

Trough support bracket 260 includes a corrugated crossmember 261. Trough support bracket 260 further includes a vertical wall 264, a horizontal step 263 and a vertical wall 264. Trough support bracket 260 further includes a vertical wall 267, a horizontal step 266 and a vertical wall 265. Trough support bracket 260 further includes a flange 271 and a flange 273. Flange 273 is joined to vertical wall 264 and horizontal step 263 to provide strengthening of trough support bracket 260. Similarly, flange 271 is joined to vertical wall 267 and horizontal step 266 to provide further strengthening of trough support bracket 260. A distribution pipe 225 extends from T-fitting 224 through flange 271 and a feed aperture (not shown) formed in wall 267. A drain tube 235 extends from T-fitting 234 through an aperture (not shown) formed in wall 262. A distribution pipe 254 extends from T-fitting 253 through flange 273 and through feed aperture 256 (seen in FIG. 20) formed in vertical wall 267. A drain pipe 239 extends from T-fitting 238 through drain aperture 255 (seen in FIG. 20) formed in vertical wall 265.

FIG. 22 sets forth a section view of a portion of the trough support 204 which, in turn, is shown supporting a portion of the one-piece helical trough 201 also shown in section view. FIG. 22 shows feed pipes 220 and 221 having trough support bracket 240 secured therebetween. As described above, feed pipe 220 includes T-fitting 222 having distribution pipe 223 extending therefrom. Similarly, feed pipe 221 includes T-fitting 251 having distribution pipe 252 extending therefrom.

Trough support bracket 240 includes a corrugated crossmember 241 having vertical wall 247 on one end thereof. Trough support bracket 240 further includes horizontal step 246 and vertical wall 245. Flange 272 is joined to the undersides of horizontal step 246 and vertical wall 247 to further strengthen trough support bracket 240. Vertical wall 247 further defines a feed aperture 249. Distribution pipe 252 extending from T-fitting 251 passes through an aperture formed in flange 272 and communicates with feed aperture 249. Similarly, trough support bracket 240 further includes vertical wall 244, horizontal step 243 and vertical wall 242. Flange 270 is joined to the undersides of horizontal step 243 and vertical wall 244 to further strengthen trough support bracket 240. Vertical wall 244 further defines a feed aperture 258. Distribution pipe 223 extending from T-fitting 222 passes through an aperture formed in flange 270 and communicates with feed aperture 258. Thus, with concurrent reference to FIGS. 20, 21 and 22, it will be noted that trough support bracket 240 is supported between feed pipes 220 and 221 and between drain pipes 230 and 231 through the attachments of distribution pipes 223 and 252 together with drain tubes 233 and 237. This support is fundamental to the structure of agricultural growing structure 200 (seen in FIG. 18) as each tier of one-piece helical trough 201 is supported along the tier by trough support brackets such as trough support bracket 240 shown in FIG. 22.

FIG. 22 also shows a portion of helical trough 201 supported upon trough support bracket 240. As mentioned above and in accordance with an important aspect of the present invention, helical trough 201 is formed of a single one-piece extruded member which is supported at selected points along the helical trough by trough support brackets such as trough support bracket 240. In the preferred fabrication of the present invention, the portions of helical trough 201 resting upon the trough support brackets in the manner illustrated in FIG. 22 as helical trough 201 is received upon trough support bracket 240, conform to the surface contours of trough support bracket 240 and may be secured by a conventional adhesive attachment or other forms of attachment.

Helical trough 201 defines a corrugated bed portion 205 having vertical walls 280 and 283 extending upwardly on each side thereof. The corrugated structure of corrugated bed portion 205 defines a plurality of flow channels 286 which extend the entire length of helical trough 201. Helical trough 201 further includes a second pair of walls 281 and 284 spaced outwardly from walls 280 and 283 respectively thereby forming a pair of overflow channels 282 and 285, respectively, which extend on either side of helical trough 201. It will be noted that walls 280 and 283 are substantially shorter than walls 281 and 284 ensuring, that excessive levels of water/nutrient mixture within helical trough 201 will flow over walls 280 and 283 into overflow channels 282 and 285 respectively.

With temporary reference to FIG. 20, it will be noted that drain tubes, such as drain tubes 233 and 237, provide water flow paths into drain pipes 230 and 231, respectively, for carrying away overflow of the water/nutrient mixture from overflow channels 282 and 285. FIG. 20 also shows drain apertures, such as drain aperture 248, formed in trough support bracket 240 which are aligned with drain tubes such as drain tube 237 extending from T-fitting 236. While not shown in FIG. 20, it will be understood that apertures are formed within overflow channels 282 and 285 which allow the overflow channels to drain into the drain tubes.

Returning to FIG. 22, wall 280 of helical trough 201 defines a feed aperture 257 which is aligned with feed aperture 249 formed in vertical wall 247 of trough support bracket 240. As a result, water/nutrient mixture is able to flow from feed pipe 221 through distribution pipe 252 and through feed apertures 249 and 257 into helical trough 201. Similarly, wall 283 of helical trough 201 defines a feed aperture 259 aligned with feed aperture 258 formed in vertical wall 244 of trough support bracket 240. The alignment of feed apertures 259 and 258 allows water/nutrient mixture to flow from feed pipe 220 through distribution pipe 223 into helical trough 201. Once again, it will be understood that the structure shown in FIG. 22 is representative of and applies equally well to each of the multiple trough support brackets situated beneath helical trough 201 described above in FIGS. 18, 19 and 20. As a result, a controlled distributed flow of water/nutrient mixture is provided along the entire length of helical trough 201.

Figure 23:
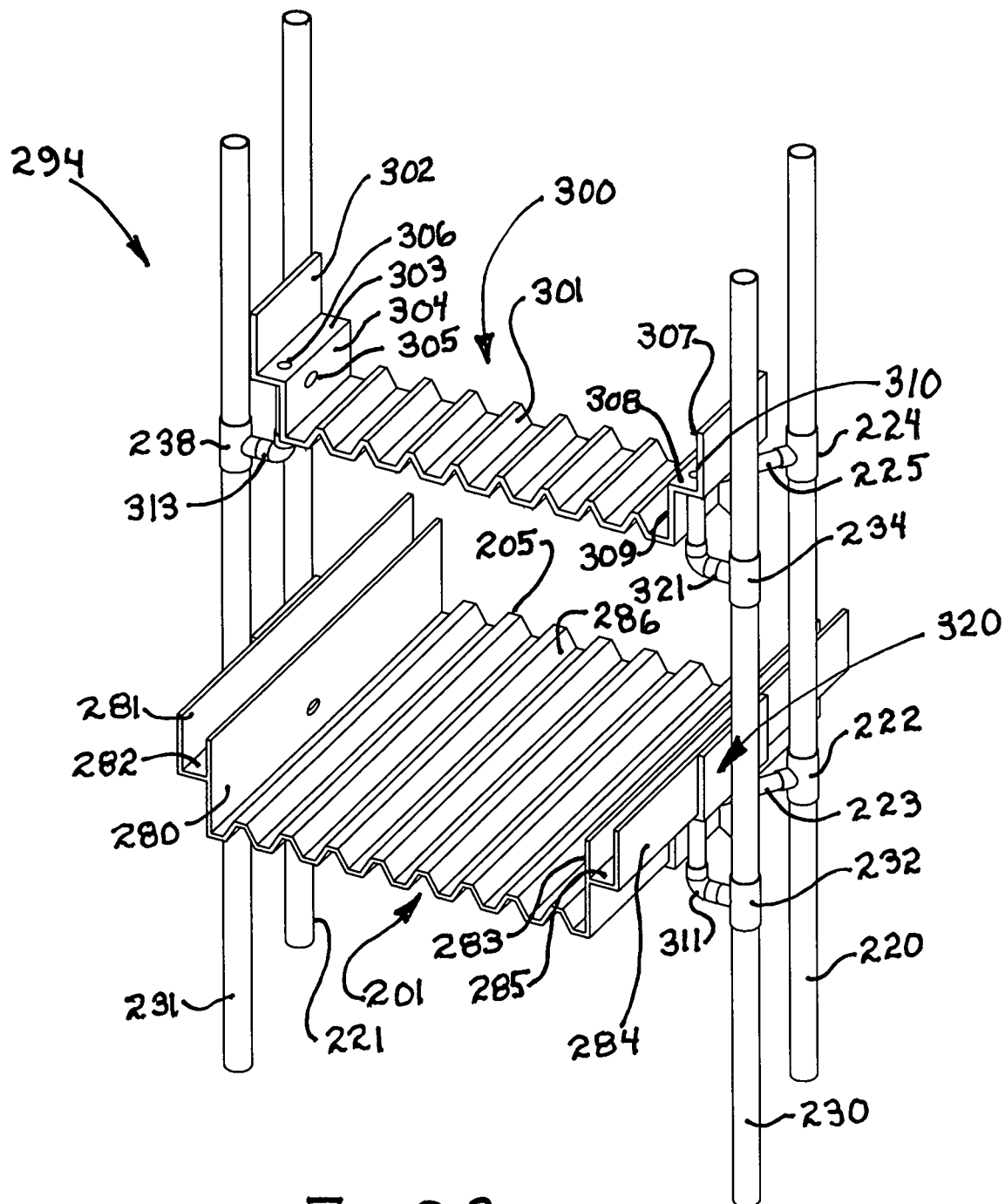
FIG. 23 sets forth a perspective view of a still further alternate embodiment of the present invention agricultural growing structure showing a portion of the trough support structure supporting a portion of the one-piece helical trough.

FIG. 23 sets forth a perspective view of a still further alternate embodiment of the present invention agricultural growing structure showing a portion of a trough support generally referenced by numeral 294 together with a segment of helical track 201. By way of overview, trough support 294 is substantially identical to trough support 204 set forth above in FIGS. 20, 21 and 22 with the difference being found in the utilization of alternative couplings for the connection of the trough drains to drain pipes 230 and 231. In essence, trough support 204 shown in FIG. 20 positions the T-fittings upon drainpipes 230 and 231 to accommodate straight aligned drain tubes attached to the trough support bracket. An example of this straight coupling may be seen in FIG. 20 by examining T-fittings 232 and 236 together with drain tubes 233 and 237 respectively upon drainpipes 230 and 231. In contrast, trough support 294 shown in FIGS. 23 and 24 utilizes L-shaped drain tubes 311 and 312. The remaining differences between trough support 204 and trough support 294 are found in the locations of the drain apertures formed in the trough support brackets and helical trough 201 to accommodate the differently shaped drain tubes. In all other respects, however, trough support 294 is substantially identical to trough support 204 and the descriptions set forth above in connection with trough support 204 will be understood, apart from the differences set forth above, to apply with equal force to trough support 294.

Accordingly, trough support 294 includes a pair of feed pipes 220 and 221 spaced on either side of a trough support bracket 300 and a trough support bracket 320. Feed pipe 220 supports T-fittings 222 and 224 which in turn support distribution pipes 223 and 225, respectively. While not seen in FIG. 23, it will be understood that feed pipe 221 supports an identical pair of T-fittings and distribution pipes. Trough support 294 further includes a pair of drainpipes 230 and 231 positioned on opposite sides of trough support brackets 300 and 320. Drain pipe 230 supports T-fittings 232 and 234 which in turn support L-shaped drain tubes 311 and 321 respectively. Drain pipe 231 supports T-fittings 236 (seen in FIG. 24) and 238 which in turn support L-shaped drain tubes 312 (seen in FIG. 24) and 313 respectively.

Trough support bracket 300 is substantially identical to trough support brackets 240 and 260 set forth above in FIG. 20. Thus, trough support bracket 300 includes a corrugated crossmember 301 having a vertical wall 304, a horizontal step 303 and a vertical wall 302 formed on one side thereof. Trough support bracket 300 further includes a vertical wall 309, a horizontal step 308 and a vertical wall 307 formed at the remaining side of cross member 301. Wall 304 defines a feed aperture 305 and step 303 defines a drain aperture 306. Similarly, wall 309 will be understood to define a feed aperture (not shown) and a drain aperture 310. It will be noted that drain apertures 306 and 310 are utilized in accommodating L-shaped drain tubes 313 and 321 respectively. This accommodation is better seen in FIG. 24. Also, trough support bracket 320 is better seen in FIG. 24 but will be understood to be substantially identical to trough support bracket 300.

As described above, helical trough 201 defines a corrugated bed portion 205 having vertical walls 280 and 283 extending upwardly on each side thereof. The corrugated structure of corrugated bed portion 205 defines a plurality of flow channels 286 which extend the entire length of helical trough 201. Helical trough 201 further includes a second pair of walls 281 and 284 spaced outwardly from walls 280 and 283 respectively thereby forming a pair of overflow channels 282 and 285, respectively, which extend on either side of helical trough 201. It will be noted that walls 280 and 283 are substantially shorter than walls 281 and 284 ensuring, that excessive levels of water/nutrient mixture within helical trough 201 will flow over walls 280 and 283 into overflow channels 282 and 285 respectively.

Figure 24:
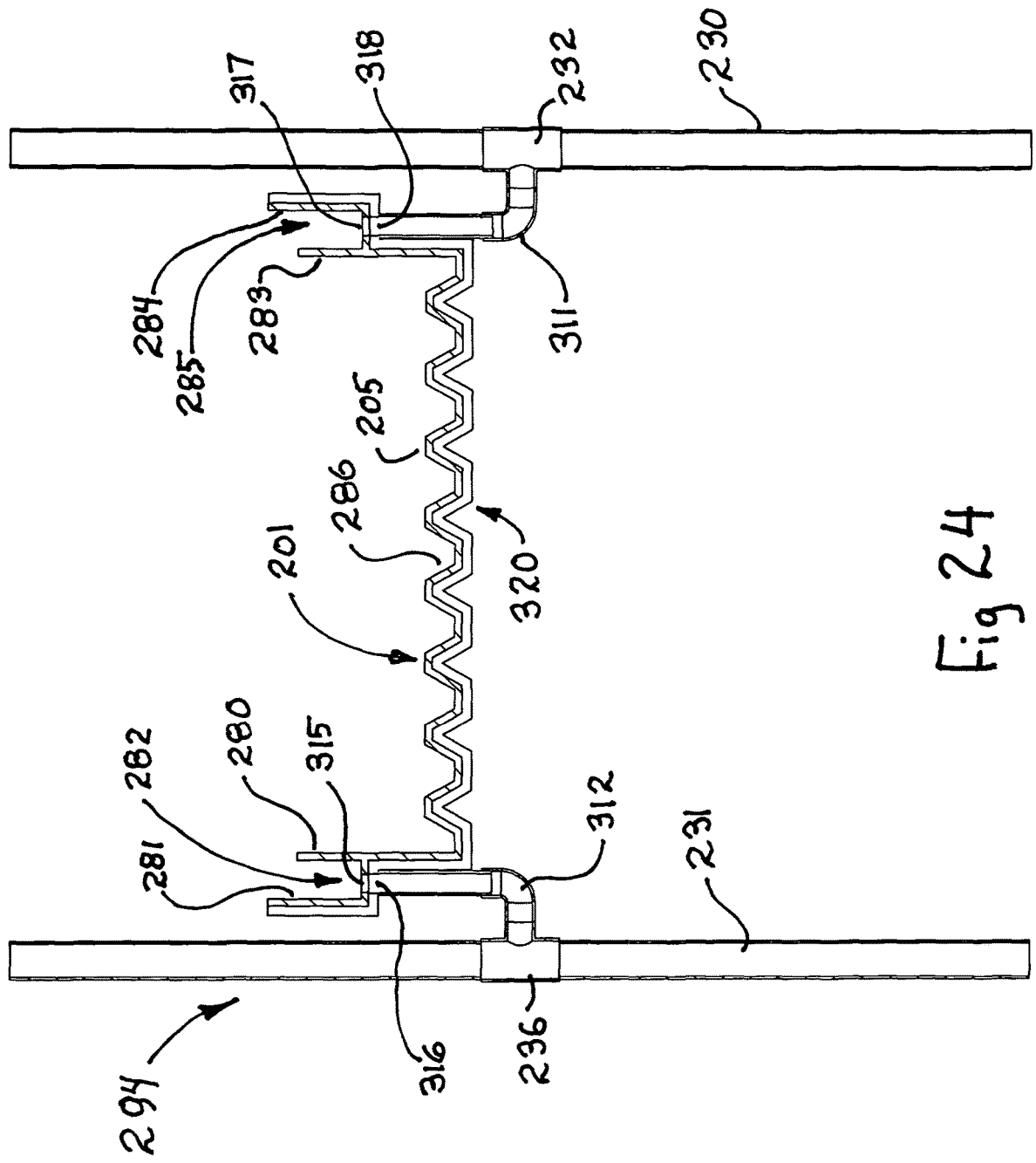
FIG. 24 sets forth a section view of a portion of the trough support structure supporting a portion of the one-piece helical trough in the still further alternate embodiment of the present invention agricultural growing structure set forth in FIG. 23.

FIG. 24 sets forth a section view of a portion of trough support 294 supporting a portion of one-piece helical trough 201. Trough support 294 includes a pair of drain pipes 230 and 231. Drain pipe 231 supports a T-fitting 232 which in turn supports an L-shaped drain tube 311. Similarly, drain pipe 231 and supports a T-fitting 236 which in turn supports an L-shaped drain tube 312. A trough support bracket 320 is supported upon L-shaped drain tubes 311 and 312 in the manner described above. Helical trough 201 includes a corrugated bed portion 205 defining a plurality of flow channels 286. As mentioned above, flow channels 286 extend the entire length of one-piece helical trough 201. As is also mentioned above, helical trough 201 includes a pair of walls 280 and 281 spaced apart to define an overflow channel 282 therebetween. Helical trough 201 also defines a pair of walls 283 and 284 spaced apart to define an overflow channel 285 therebetween. A drain aperture 315 is formed at the bottom of overflow channel 282 and a drain aperture 317 is formed at the bottom of overflow channel 285. Correspondingly, trough support bracket 320 defines an aperture 316 positioned in alignment with the upper end of drain tube 312 and drain aperture 315. Trough support bracket 320 also defines a drain aperture 318 positioned in alignment with the upper end of drain tube 311 and drain aperture 317. As water/nutrient mixture overflows into overflow channels 282 and 285 of helical trough 201, it is carried away by drain tubes 311 and 312 together with drain pipes 230 and 231. In this manner over filling and spillage within helical trough 201 is prevented.

What has been shown is an agricultural growing structure that provides a generally planar foundation pad formed of a material such as concrete, or the like, which supports a framework defining a plurality of concentric circular helical paths stacked in a cylindrical array. A plurality of helical water troughs are supported by the framework within each of the circular paths. Water circulation apparatus is provided which pumps water/nutrient mixture throughout the water trough to produce a continuous circulation of water/nutrient mixture. Each water trough is filled with a plurality of floating growing trays to form a continuous train of growing trays extending down the entire water trough. As the water and nutrient solution flows down each helical water trough, the floating growing trays are carried down the water trough. As the growing trays move, they are continuously removed from the bottom end of the water trough, harvested, restocked and added back to the top of the helix.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A hydroponic agricultural growing structure comprising:
    a supporting surface;
    a support structure formed upon said support surface;
    a plurality of floating growing trays, each defining a growing portion and each constructed to float;
    a plurality of growing medium units each supported within one of said floating growing trays;
    a one-piece helical growing trough defining a helix top end, a helix bottom end, and an open top extending from said helix top end to said helix bottom end, said helical growing trough being supported by said support structure and having a water flow surface and confining sidewalls on each side of said water flow surface and defining a width to allow said floating growing trays to float freely over said water flow surface between said confining sidewalls; and
    a water circulation system collecting water from distributed locations within said helix bottom and recirculating it to distributed locations within said helix, whereby water flows through said helical growing trough from said helix top end to said helix bottom end carrying said floating growing trays from said helix top end to said helix bottom end;
    whereby agricultural plants may be grown in said floating growing trays as said floating growing trays traverse said helical growing trough from said helix top end to said helix bottom end.

2. A hydroponic agricultural growing system comprising:
    a supporting surface;
    a support structure formed upon said support surface;
    a one piece helical growing trough defining a helix top, a helix bottom and a helical water flow trough therebetween, said helical water flow trough being supported by said support structure and having a water flow surface, an open top and confining sidewalls on each side of said water flow surface to define a trough width;
    a plurality of floating growing trays, each defining a growing portion and each constructed to float freely within said helical water flow trough and each floating growing tray being narrow enough to allow it to be carried downwardly between said sidewalls within said helical water flow trough under the urging of said helical water flow;
    a plurality of growing medium units each supported within one of said floating growing trays; and
    a water circulation system collecting water from said helix bottom and recirculating it to said helix top such that water flows from said helix top, through said helical water flow trough, to said helix bottom forming a helical water flow causing said floating growing trays to traverse said helical growing trough from said helix top to said helix bottom.

3. A hydroponic agricultural growing system comprising:
    a one piece helical growing trough defining an upper end and a lower end, a trough bottom surface, trough sidewalls, an open top extending from said upper end to said lower end, said growing trough formed of a one piece extruded member;
    a support structure for supporting said helical growing trough, said upper end and said lower end;
    a liquid recirculation system coupled to said upper end and said lower end providing liquid circulation which travels downwardly from said upper end through said helical growing trough to said lower end and is returned to said upper end;
    a plurality of floating growing trays each defining a growing tray width smaller than said trough interior width and each including a plant growth medium suitable for receiving plants and each defining a plurality of apertures through which liquid and plants may combine, said floating growing trays constructed to be received within and travel through said helical growing trough.

* * * * *